(12) United States Patent
de Lucas Casamayor

(10) Patent No.: US 12,387,413 B2
(45) Date of Patent: *Aug. 12, 2025

(54) GRAPHICS PROCESSING SYSTEM AND METHOD OF RENDERING

(71) Applicant: Imagination Technologies Limited, Kings Langley (GB)

(72) Inventor: Enrique de Lucas Casamayor, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 251 days.

This patent is subject to a terminal disclaimer.

(21) Appl. No.: 18/080,036

(22) Filed: Dec. 13, 2022

(65) Prior Publication Data

US 2023/0230307 A1 Jul. 20, 2023

(30) Foreign Application Priority Data

Dec. 13, 2021 (GB) ..................................... 2117998
Dec. 13, 2021 (GB) ..................................... 2117999

(51) Int. Cl.
*G06T 15/00* (2011.01)
*G06T 15/04* (2011.01)

(52) U.S. Cl.
CPC .............. *G06T 15/005* (2013.01); *G06T 15/04* (2013.01)

(58) Field of Classification Search
CPC ....... G06T 15/00; G06T 15/40; G06T 15/005; G06T 15/80; G06T 11/40; G06T 11/001; G06T 1/20
See application file for complete search history.

(56) References Cited

U.S. PATENT DOCUMENTS

| 2015/0287240 | A1 | 10/2015 | Janczak et al. | |
| 2018/0240268 | A1* | 8/2018 | Nevraev | G06T 11/40 |
| 2019/0340812 | A1* | 11/2019 | Fuetterling | G06T 9/00 |
| 2020/0242828 | A1* | 7/2020 | Brigg | G06T 15/005 |

* cited by examiner

*Primary Examiner* — Yu Chen
(74) *Attorney, Agent, or Firm* — Potomac Law Group, PLLC; Vincent M DeLuca

(57) ABSTRACT

A method of rendering, in a rendering space, a scene formed by primitives in a graphics processing system. A rendering phase receives data describing one or more primitives and one or more associated fragment shading rates to be used during rendering. Fragments for the one or more primitives corresponding to sample positions of the one or more primitives within a region of the rendering space are stored in a buffer sampler. The buffer is parsed to produce microtiles, each microtile corresponding to an array of sample positions within the region and containing sampler fragments from the one or more primitives, the microtiles are analysed to identify shader fragment task instances to be shaded, and the shader fragment task instances are arranged into blocks, wherein at least one block of shader fragment task instances comprises shader fragment task instances from more than one microtile. The blocks of shader fragment task instances are shaded.

20 Claims, 10 Drawing Sheets

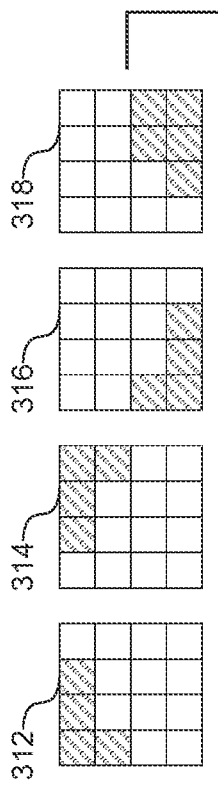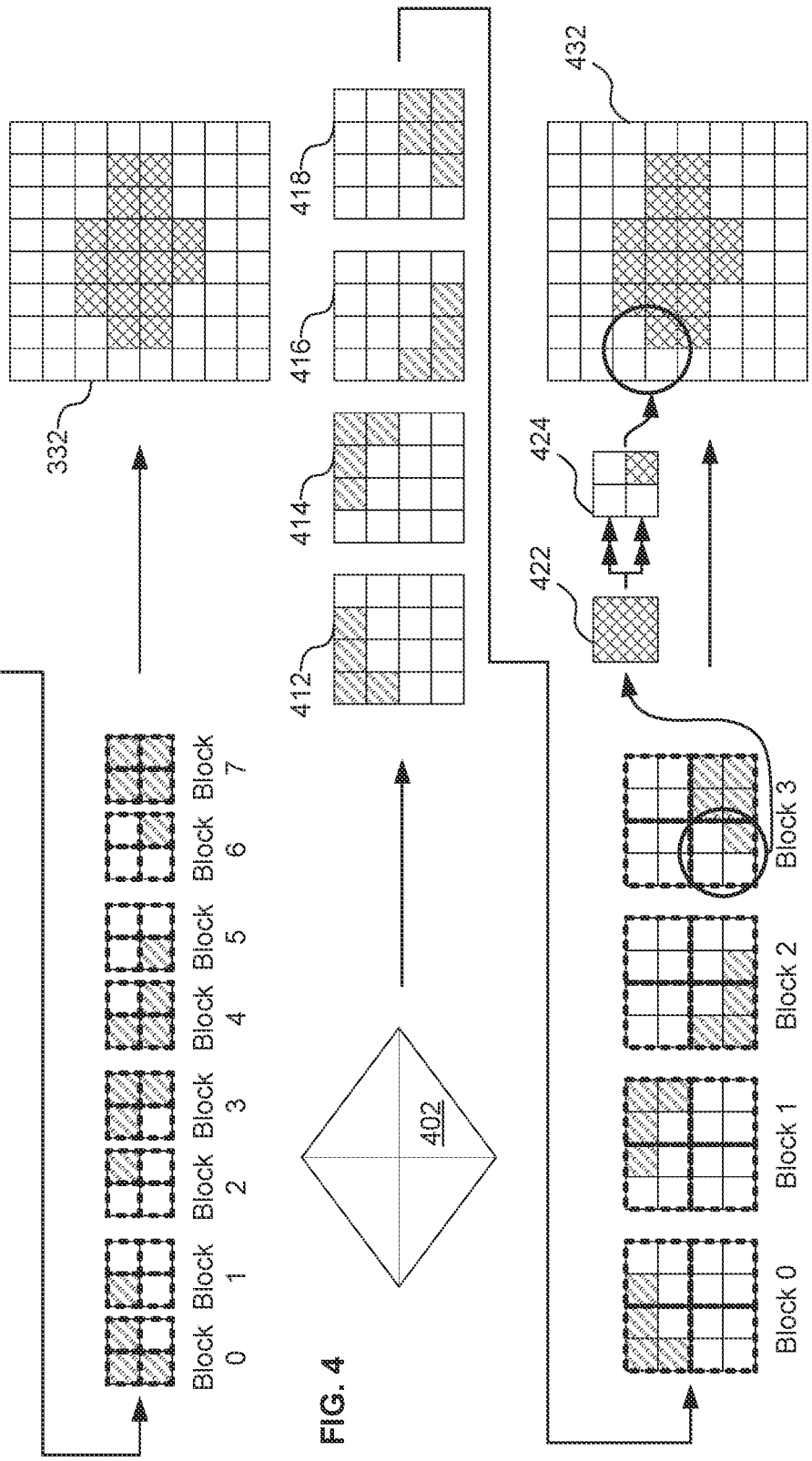
FIG. 3
FIG. 4

GRAPHICS PROCESSING SYSTEM AND METHOD OF RENDERING

CROSS-REFERENCE TO RELATED APPLICATIONS AND CLAIM OF PRIORITY

This application claims priority under 35 U.S.C. 119 from UK patent application No. 2117998.1 filed on 13 Dec. 2021, and UK patent application No. 2117999.9 also filed on 13 Dec. 2021, which are both herein incorporated by reference in their entirety.

TECHNICAL FIELD

The present disclosure relates to graphics processing systems, in particular those implementing variable fragment shading rates.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are sections of the rendering space, and may have any suitable shape, but are typically rectangular (where the term "rectangular" includes square). As is known in the art, there are many benefits to subdividing the rendering space into tile sections. For example, subdividing the rendering space into tile sections allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase (e.g. a rasterisation phase), a particular tile can be rendered by processing those graphics data items which are determined to be present within that tile (without needing to process graphics data items which were determined in the geometry processing phase to not be present within the particular tile).

When rendering an image, it is known that the render may use more sample points than the number of pixels with which an output image will be represented. This over-sampling can be useful for anti-aliasing purposes, and is typically specified to a graphics processing pipeline as a constant (i.e. a single anti-aliasing rate) for the entire image.

More recently, the idea of variable fragment shading rates has been considered. Here, a render may use fewer shading sample points than the number of pixels (which may be termed 'subsampling') or more shading sample points than the number of pixels (which may be termed 'multisampling'), depending on the situation. Moreover, different parts of the same image may have different fragment shading rates. For example, higher sampling rates may still be useful for anti-aliasing purposes in parts of great detail or focus, but lower shading sampling rates may reduce the processing in rendering areas of uniformity or low importance parts of the image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, there is provided a method of rendering, in a rendering space, a scene formed by primitives in a graphics processing system, the method comprising one or more of: a rendering phase comprising the steps of: receiving data describing one or more primitives and one or more associated fragment shading rates to be used during rendering; storing in a buffer sampler fragments for the one or more primitives corresponding to sample positions of the one or more primitives within a region of the rendering space; parsing the buffer to produce microtiles, each microtile corresponding to an array of sample positions within the region and containing sampler fragments from the one or more primitives; analysing the microtiles to identify shader fragment task instances to be shaded, and arranging the shader fragment task instances into blocks, wherein at least one block of shader fragment task instances comprises shader fragment task instances from more than one microtile; and shading the blocks of shader fragment task instances.

The graphics processing system may be a tile-based graphics processing system, wherein the method comprises performing the steps of the rendering phase on a tile-by-tile basis (i.e. performing the steps for each tile separately). As such, the buffer (only) stores sampler fragments for a single tile at a time.

The range of fragment shading rates may include a 'per-pixel' fragment shading rate. However, the one or more fragment shading rates associated with the primitives may each be coarser than a 'per-pixel' fragment shading rate (i.e. they may specify a plural number of pixels to be shaded together).

Optionally, the at least one block of shader fragment task instances comprises shader fragment task instances having the same fragment shading rate.

Optionally, the shader fragment task instances arranged into a given block relate to neighbouring shader fragments in the rendering space, optionally a 2×2 block of shader fragment ins the rendering space.

Optionally, shading comprises, for a shader fragment task instance of the at least one block, calculating a delta value for a parameter using information about another one of the shader fragments that corresponds to a shader fragment task instance within the same block.

Optionally, analysing the microtiles comprises identifying shader fragment task instances within a microtile.

Optionally, parsing the buffer to produce microtiles comprises, for each one of a plurality of fragment shading rates in turn, searching the buffer for samples associated with the one of the plurality of fragment shading rates and outputting the associated microtiles.

Optionally, storing in a buffer comprises performing hidden surface removal to identify and not store one or more sampler fragments within the rendering space that do not contribute to the scene to be rendered.

Optionally, storing in the buffer comprises storing sampler fragments for a plurality of primitives corresponding to the sample positions within the region of the rendering space.

Optionally, the method further comprises a geometry processing phase before the rendering phase.

Optionally, the geometry processing phase comprises transforming the primitives into the rendering space, and storing data relating to the transformed primitives, and/or determining and storing control stream data indicating which primitives are relevant for rendering different regions of the rendering space.

According to a second aspect, there is provided a graphics processing system configured to render a scene formed by primitives, wherein the graphics processing system comprises rendering logic configured to: receive data describing one or more primitives and one or more associated fragment shading rates to be used during rendering; store, in a buffer, sampler fragments for the one or more primitives corresponding to sample positions of the one or more primitives within a region of the rendering space; parse the buffer to produce microtiles, each microtile corresponding to an array of sample positions within the region and containing sampler fragments from the one or more primitives; analyse the microtiles to identify shader fragment task instances to be shaded, and arrange the shader fragment task instances into blocks, wherein at least one block of shader fragment task instances comprises shader fragment task instances from more than one microtile; and shade the blocks of shader fragment task instances.

The graphics processing system may be a tile-based graphics processing system, wherein the rendering logic is configured to perform the recited steps on a tile-by-tile basis (i.e. is configured to operate on each tile separately). As such, the buffer (only) stores sampler fragments for a single tile at a time.

The range of fragment shading rates may include a 'per-pixel' fragment shading rate. However, the one or more fragment shading rates associated with the primitives may each be coarser than a 'per-pixel' fragment shading rate (i.e. they may specify a plural number of pixels to be shaded together).

Optionally, the at least one block of fragment task instances comprises fragment task instances having the same fragment shading rate.

Optionally, the fragment task instances arranged into a given block relate to neighbouring fragments in the rendering space, optionally a 2×2 block of shader fragment ins the rendering space.

Optionally, the rendering logic configured to shade the blocks of shader fragment task instances is further configured, for a shader fragment task instance of the at least one block, to calculate a delta value for a parameter using information about another one of the shader fragments that corresponds to a shader fragment task instance within the same block.

Optionally, the rendering logic configured to analyse the microtiles is further configured to identify fragment task instances within a microtile.

Optionally, the rendering logic configured to parse the buffer to produce microtiles is further configured, for each one of a plurality of fragment shading rates in turn, search the buffer for samples associated with the one of the plurality of fragment shading rates and output the associated microtiles.

Optionally, the rendering logic configured to store sampler fragments in a buffer is further configured to perform hidden surface removal to identify and not store one or more sampler fragments within the rendering space that do not contribute to the scene to be rendered.

Optionally, the graphics processing system further comprises geometry processing logic configured to transform the primitives into the rendering space, and store data relating to the transformed primitives in a memory, and/or to determine and store in a memory control stream data indicating which primitives are relevant for rendering different regions of the rendering space.

According to a third aspect, there is provided a graphics processing system configured to perform the method of any preceding variation of the first aspect.

The graphics processing system may be embodied in hardware on an integrated circuit. There may be provided a method of manufacturing, at an integrated circuit manufacturing system, the graphics processing system. There may be provided an integrated circuit definition dataset that, when processed in an integrated circuit manufacturing system, configures the system to manufacture the graphics processing system. There may be provided a non-transitory computer readable storage medium having stored thereon a computer readable description of the graphics processing system that, when processed in an integrated circuit manufacturing system, causes the integrated circuit manufacturing system to manufacture an integrated circuit embodying the graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

There is also provided a method of rendering, in a rendering space in a graphics processing system, a scene formed by primitives, the method comprising: a rendering phase comprising the steps of: receiving data describing one or more primitives and two or more associated fragment shading rates to be used during rendering; identifying, from the primitives, shader fragment task instances to be shaded, wherein the shader fragment task instances comprise shader fragment task instances associated with a first fragment shading rate and shader fragment task instances associated with a second fragment shading rate; combining shader fragment task instances into a shading task, the shading task comprising fragment task instances associated with the first fragment shading rate and fragment task instances associated with the second fragment shading rate, and wherein the fragment task instances combined into the shading task require a common shader program; and processing the shading task.

There is also provided a graphics processing system configured to render a scene formed by primitives, wherein the graphics processing system comprises rendering logic configured to: receive data describing one or more primitives and two or more associated fragment shading rates to be used during rendering; identify, from the primitives, shader fragment task instances to be shaded, wherein the shader fragment task instances comprise shader fragment task instances associated with a first fragment shading rate and shader fragment task instances associated with a second fragment shading rate; combine shader fragment task instances into a shading task, the shading task comprising fragment task instances associated with the first fragment shading rate and fragment task instances associated with the second fragment shading rate, and wherein the fragment task instances combined into the shading task require a common shader program; and process the shading task.

BRIEF DESCRIPTION OF THE DRAWINGS

Examples will now be described in detail with reference to the accompanying drawings in which:

FIG. 3 illustrates how a graphics processing system can process a primitive for shading with a 1×1 fragment shading rate;

FIG. 4 illustrates how a graphics processing system can process a primitive for shading with a 2×2 fragment shading rate;

Figure 1:
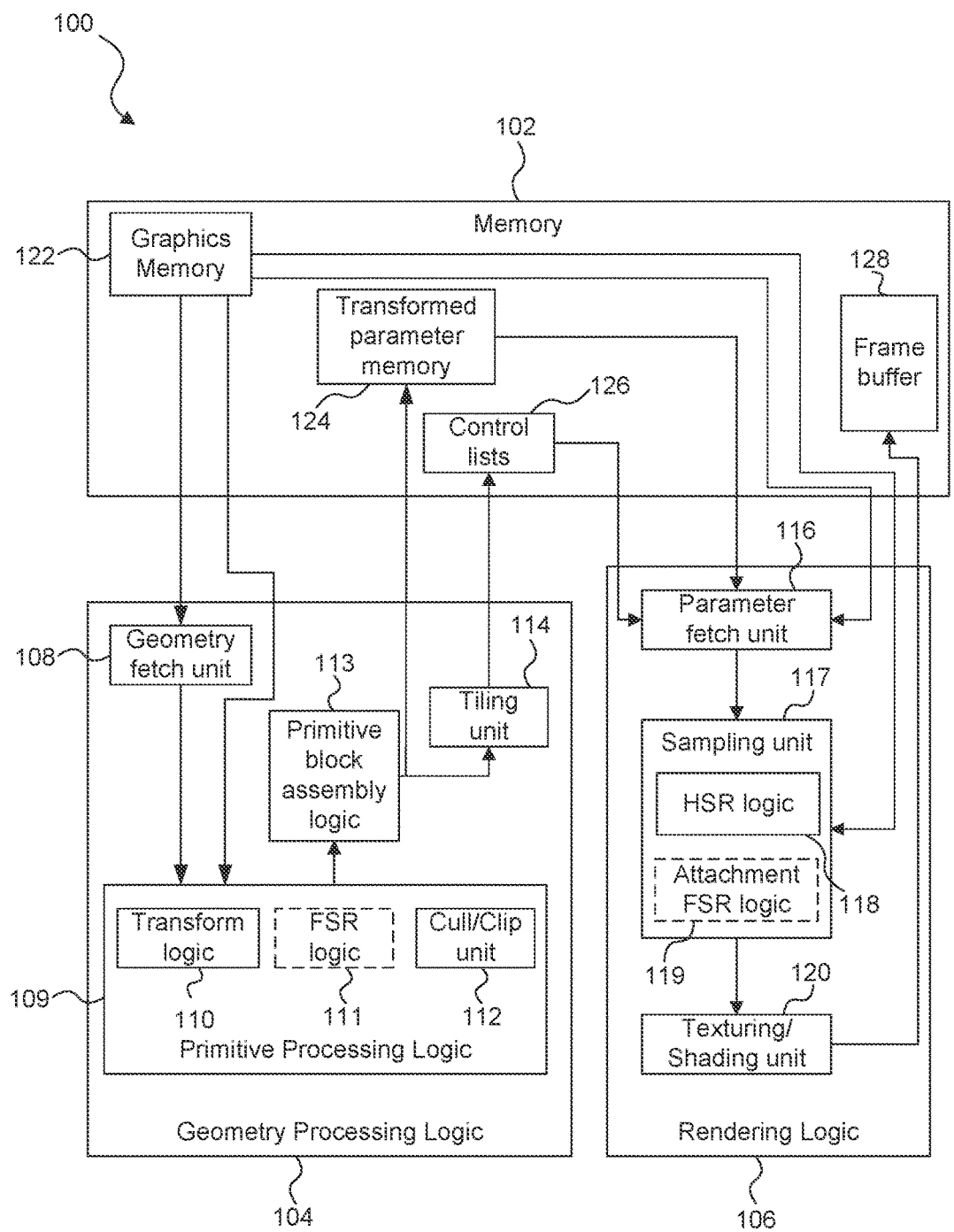
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Fragment shading rate (FSR) values can be specified to a graphics processing system in a number of ways. One way is to specify FSR values by a 'pipeline' or 'per draw' FSR technique, which associates a particular fragment shading rate value with a particular draw call (and thus for the primitives associated with that draw call). Another way is to specify FSR values by a 'primitive' or 'provoking vertex' FSR technique, which sets a particular fragment shading rate value at a per-primitive granularity. A third way is to specify FSR values by an 'attachment' or 'screen space image', which allows for the fragment shading rate to be specified based on the area of the image being rendered. For example, in the attachment FSR technique the rendering space may be divided into areas, each area (or region) associated with a particular FSR value. The FSR values for the areas of the rendering space may be specified using attachment information defining texels that map to each of the areas of the rendering space, each texel being associated with an FSR value for its corresponding area of the rendering space. Alternatively, a single FSR value may be set for the whole rendering space.

These three different techniques for specifying fragment shading rate values may be used individually or in combination. As such, in practice, having all the different techniques available creates different sources of FSR information that need to be reconciled by a graphics processing system. For example, a particular primitive may be part of a particular draw call and rendered in a particular area of the rendering space. In that example, that particular primitive may be associated with some or all of (i) a pipeline FSR value specified as part of the particular draw call, (ii) a primitive FSR value specified for that particular primitive and (iii) an attachment FSR value specified for the particular area of the rendering space in which the primitive is rendered. Indeed, the situation may be more complicated than that—the primitive may fall across one or more boundaries between areas of pixels that map to different attachment FSR texels, so different sample points within the single primitive may have different FSR values associated with them.

The manner in which the values from different FSR sources are combined, to calculate a resolved combined FSR that will be applied for a primitive (or part thereof), can be specified to the graphics processing system by the instructing application. That is, different types of combination operation are possible. In this sense, a combination operation can be mathematical and/or logical in nature. As such, a logical combination operation may be specified that dictates that a value from a particular one of the FSR sources should be selected for use. For example, a so-called 'keep' combination operation can specify that a first one of a pair of FSR values (e.g. the pipeline fragment shading rate and primitive fragment shading rate) should be selected for use. As another example, a so-called 'replace' combination operation can specify that a second one of a pair of FSR values should be selected for use. Another approach may require a mathematical determination to inform a logical operation performed on the different values from the different FSR sources, to determine the resolved combined FSR. For example, a so-called 'min' combination operation can specify that the minimum FSR value of a set or subset of the FSR values should be selected for use. As another example, a so-called 'max' combination operation can specify that the maximum FSR value of a set or subset of FSR values should be selected for use. In these examples, a mathematical determination (i.e. establishing which is the maximum or minimum value) is used to decide which value to use. Other combination operations may be thought of as more 'purely' mathematical. For example, the use of a so-called 'mul' operation that specifies that a set or subset of the FSR values should be multiplied together to calculate the FSR value for use. It will be understood that in principle any other mathematical operation could be used to combine FSR values from different sources.

It will also be understood that multiple combination operations may be used to combine the values from different sources—e.g. a first combination operation may be used to combine a pipeline FSR value and a primitive FSR value, to produce a first combined FSR value, and a second combination operation (which may be of the same type as the first combination operation, or a different type) may be used to combine an attachment FSR value with the first combined FSR value to produce a second or final combined FSR value.

The present disclosure presents ways in which these different sources of fragment shading rate may be handled and combined efficiently in a graphics processing system.

Embodiments will now be described by way of example only.

General System

FIG. 1 shows an example graphics processing system 100. The example graphics processing system 100 is a tile-based graphics processing system. As mentioned above, a tile-based graphics processing system uses a rendering space which is subdivided into a plurality of tiles. The tiles are sections of the rendering space, and may have any suitable shape, but are typically rectangular (where the term "rectangular" includes square). The tile sections within a rendering space are conventionally the same shape and size.

The system 100 comprises a memory 102, geometry processing logic 104 and rendering logic 106. The geometry processing logic 104 and the rendering logic 106 may be implemented on a GPU and may share some processing resources, as is known in the art. The geometry processing logic 104 comprises a geometry fetch unit 108; primitive processing logic 109, which in turn comprises geometry transform logic 110, FSR logic 111 and a cull/clip unit 112; primitive block assembly logic 113; and a tiling unit 114. The rendering logic 106 comprises a parameter fetch unit 116; a sampling unit 117 comprising hidden surface removal (HSR) logic 118; and a texturing/shading unit 120. The example system 100 is a so-called "deferred rendering" system, because the texturing/shading is performed after the hidden surface removal. However, a tile-based system does not need to be a deferred rendering system, and although the present disclosure uses a tile-based deferred rendering system as an example, the ideas presented are also applicable to non-deferred (known as immediate mode) rendering systems or non-tile-based systems. The memory 102 may be implemented as one or more physical blocks of memory and includes a graphics memory 122; a transformed parameter memory 124; a control lists memory 126; and a frame buffer 128.

Figure 2:
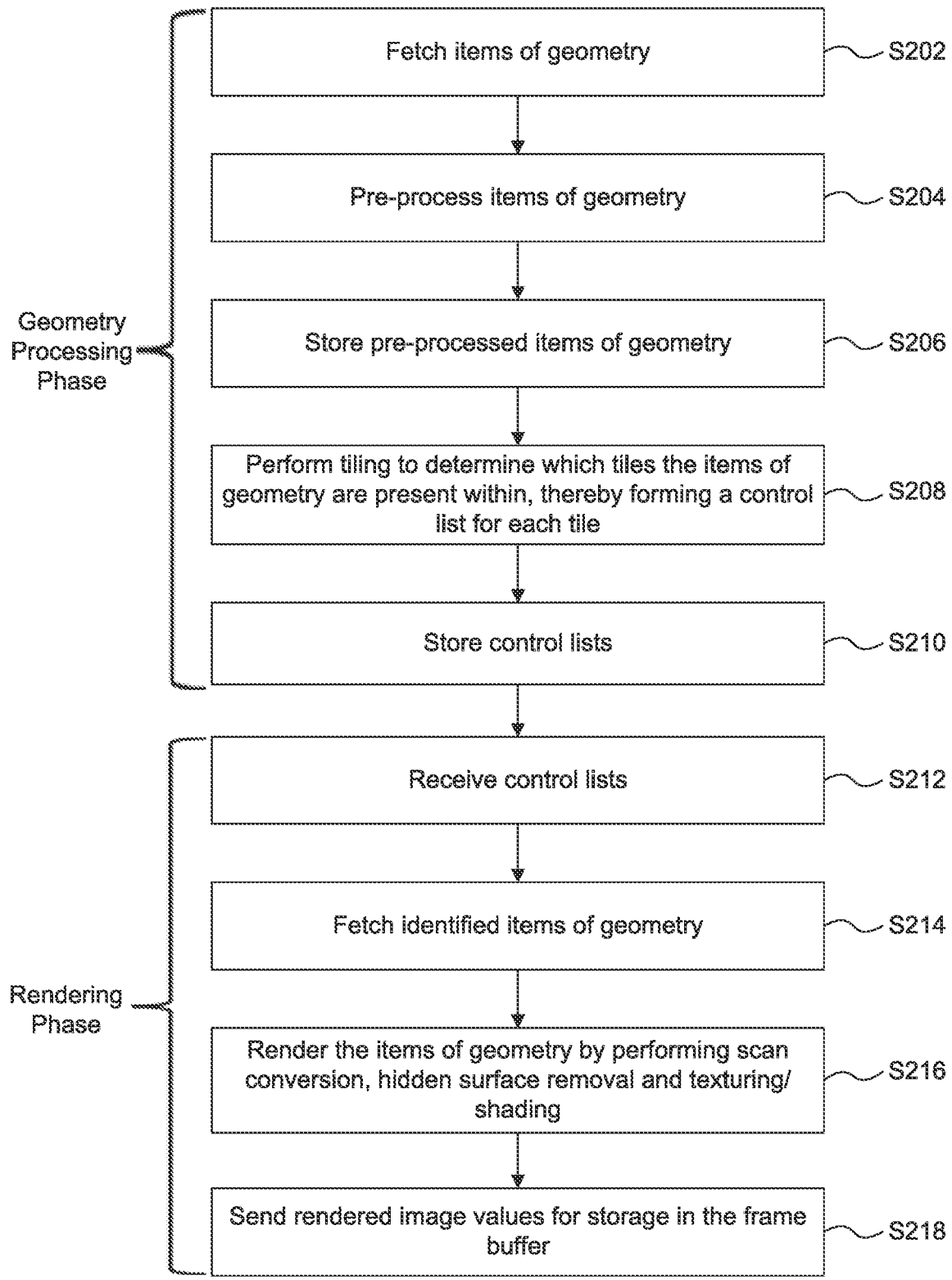
FIG. 2 shows a method that can be implemented by a graphics processing system such as that of FIG. 1.

FIG. 2 shows a flow chart for a method of operating a tile-based rendering system, such as the system shown in FIG. 1. The geometry processing logic 104 performs the geometry processing phase, in which the geometry fetch unit 108 fetches geometry data (e.g. previously received from an application for which the rendering is being performed) from the graphics memory 122 (in step S202) and passes the fetched data to the primitive processing logic 109. The geometry data comprises graphics data items (i.e. items of geometry) which describe geometry to be rendered. For example, the items of geometry may represent geometric shapes, which describe surfaces of structures in the scene. The items of geometry may be in the form of primitives (commonly triangles, but primitives may be other 2D shapes and may also be lines or points to which a texture can be applied). Primitives can be defined by their vertices, and vertex data can be provided describing the vertices, wherein a combination of vertices describes a primitive (e.g. a triangular primitive is defined by vertex data for three vertices). Objects can be composed of one or more such primitives. In some examples, objects can be composed of many thousands, or even millions of such primitives. Scenes typically contain many objects. Items of geometry can also be meshes (formed from a plurality of primitives, such as quads which comprise two triangular primitives which share one edge). Items of geometry may also be patches, wherein a patch is described by control points, and wherein a patch is tessellated to generate a plurality of tessellated primitives.

In step S204 the geometry processing logic 104 preprocesses the items of geometry, e.g. by transforming the items of geometry into screen space, performing vertex shading, performing geometry shading and/or performing tessellation, as appropriate for the respective items of geometry. In particular, the primitive processing logic 109 (and its sub-units) may operate on the items of geometry, and in doing so may make use of state information retrieved from the graphics memory 122. For example, the transform logic 110 in the primitive processing logic 109 may transform the items of geometry into the rendering space and may apply lighting/attribute processing as is known in the art. The resulting data may be passed to the cull/clip unit 112 which may cull and/or clip any geometry which falls outside of a viewing frustum. FSR logic 111 may also be employed to determine an FSR value associated with the various primitives. The FSR value may be the result of combining some or all of the relevant values from different FSR sources. For example, the FSR logic 111 may be configured to determine FSR values for the primitives by combining primitive and pipeline FSR values. The remaining transformed items of geometry (e.g. primitives) are provided from the primitive processing logic 109 to the primitive block assembly logic 113 which groups the items of geometry into blocks, also referred to as "primitive blocks", for storage. A primitive block is a data structure in which data associated with one or more primitives (e.g. the transformed geometry data related thereto) are stored together. For example, each block may comprise up to N primitives, and up to M vertices, where the values of N and M are an implementation design choice. For example, N might be 24 and M might be 16. Each block can be associated with a block ID such that the blocks can be identified and referenced easily. Primitives often share vertices with other primitives, so storing the vertices for primitives in blocks allows the vertex data to be stored once in the block, wherein multiple primitives in the primitive block can reference the same vertex data in the block. The primitive blocks may also store the FSR information determined by the FSR logic 111. In step S206 the primitive blocks with the transformed geometric data items are provided to the memory 102 for storage in the transformed parameter memory 124. The transformed items of geometry and information regarding how they are packed into the primitive blocks are also provided to the tiling unit 114. In step S208, the tiling unit 114 generates control stream data for each of the tiles of the rendering space, wherein the control stream data for a tile includes a control list of identifiers of transformed primitives which are to be used for rendering the tile, i.e. a list of identifiers of transformed primitives which are positioned at least partially within the tile. The collection of control lists of identifiers of transformed primitives for individual tiles may be referred to as a "control stream list" or "display list". In step S210, the control stream data for the tiles is provided to the memory 102 for storage in the control lists memory 126. Therefore, following the geometry processing phase (i.e. after step S210), the transformed primitives to be rendered are stored in the transformed parameter memory 124 and the control stream data indicating which of the transformed primitives are present in each of the tiles is stored in the control lists memory 126. In other words, for given items of geometry, the geometry processing phase is completed and the results of that phase are stored in memory before the rendering phase begins.

In the rendering phase, the rendering logic 106 renders the items of geometry (primitives) in a tile-by-tile manner. In step S212, the parameter fetch unit 116 receives the control stream data for a tile, and in step S214 the parameter fetch unit 116 fetches the indicated transformed primitives from the transformed parameter memory 124, as indicated by the control stream data for the tile. In step S216 the rendering logic 106 renders the fetched primitives by performing sampling on the primitives to determine primitive fragments which represent the primitives at discrete sample points within the tile, and then performing hidden surface removal and texturing/shading on the primitive fragments. In particular, the fetched transformed primitives are provided to the sampling unit 117 (which may also access state information, either from the graphics memory, or stored with the transformed primitives), which performs sampling and determines the primitive fragments to be shaded. As part of determining the primitive fragments to be shaded, the sampling unit 117 uses hidden surface removal (HSR) logic 118 to remove primitive fragments which are hidden (e.g. hidden by other primitive samples). Methods of performing sampling and hidden surface removal are known in the art. Conventionally, the term "fragment" refers to a sample of a primitive at a sampling point, which is to be shaded to assist with determining how to render a pixel of an image (N.B. with anti-aliasing, multiple samples might be shaded to determine how to render a single pixel). However, with variable FSR, there may not be a one to one correspondence between the fragments generated by sampling, and the fragments that are shaded. Therefore, the terms "sampler fragments" (fragments created by sampling primitives) and "shader fragments" (fragments upon which fragment shader programs are executed) are used herein where it is necessary to distinguish between fragments at different units of the GPU. For example, one shader fragment may be processed to determine colour values for more than one sampler fragment. The term "sampling" is used herein to describe the process of generating discrete fragments (sampler fragments) from items of geometry (e.g. primitives), but this process can sometimes be referred to as "rasterisation" or "scan conversion". As mentioned above, the system 100 of FIG. 1 is a deferred rendering system, and so the hidden surface removal is performed before the texturing/shading. However, other systems may render fragments before performing hidden surface removal to determine which fragments are visible in the scene.

Sampler fragments which are not removed by the HSR logic 118 are provided from the sampling unit 117 to the texturing/shading unit 120, where, as shader fragments, texturing and/or shading is applied. Before that, attachment FSR logic 119 may be used to further determine FSR values associated with the samples. This may be additional to or instead of the determination performed by FSR logic 111, depending on the system (and hence both FSR logic blocks are indicated by dashed lines, to show that one or the other may be optional). However, if FSR logic 111 determined the combination of the pipeline and primitive FSR values, the attachment FSR logic 119 may be configured to combine the results of those first combinations with any attachment FSR values, for example.

The texturing/shading unit 120 is typically configured to efficiently process multiple fragments in parallel. This can be done by determining individual fragments that require the same processing (e.g. need to run the same fragment shader) and treating them as instances of the same task, which are then run in parallel, in a SIMD (single instruction, multiple data) processor for example. To assist with this, in some implementations, sampler fragments from the same primitive may be provided to the texturing/shading unit 120 in so-called 'microtiles', being groups of sampler fragments. A microtile may correspond to, for example, a 4×4 array of sample points corresponding to a particular area of the render space, and thus may include up to 16 sampler fragments (depending on the primitive coverage within the microtile), and thus up to 16 task instances, if each sampler fragment is shaded as one shader fragment. It will be understood that these microtiles are separate to the 'tiles' used in tile-based rendering. As explained above, a tile is a sub-division of the overall render space for which the graphics data can be temporarily stored "on-chip" during the rendering of the tile. As such, the sampling results of a single tile may be stored in a buffer (e.g. within the sampling unit). A microtile represents the sampling (and optionally hidden surface removal) result of part or all of a particular primitive or primitives in a particular sub-area of a tile, and which is issued from the sampling unit 117 to the texturing/shading unit 120. As such, multiple microtiles may be generated from the buffer storing the sampling results of a single tile.

Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rendering phase is performed for each of the tiles, such that a whole image can be rendered with pixel values for the whole image being determined. In step S218, the rendered pixel values are provided to the memory 102 for storage in the frame buffer 128. The rendered image can then be used in any suitable manner, e.g. displayed on a display, or stored in memory or transmitted to another device, etc.

Interaction of FSR With General System

FIGS. 3 and 4 illustrate how different fragment shading rate values can affect the workload on the general processing system set out above.

FIG. 3 illustrates the simplest situation of using a 1×1 fragment shading rate value, in which each shader fragment instance corresponds to one sampler fragment. In the example, an object 302 is formed by four right-angular triangle primitives meeting at the centre of the object. During rasterisation, it is determined that the object 302 covers four microtiles 312, 314, 316 & 318 (a microtile being, in this example, a 4×4 array of sampler fragments). In the example, each primitive is in a single microtile for ease of understanding, but this need not be the case in practice. The sampler fragment coverage within each microtile 312, 314, 316 & 318 is determined and indicated by the cross-hatching. In this example, using a 1×1 FSR value, each sampler fragment corresponds to a shader fragment that is shaded individually during rasterisation, and so corresponds to one shading task instance. In this example, the shader fragments are grouped into blocks of instances (Blocks 0 to 7 in FIG. 3) for shading in parallel. In this example, 2×2 instances from the microtiles 312, 314, 316 & 318 are grouped into a block (i.e. Blocks 0 & 1 are derived from microtile 312, Blocks 2 & 3 are derived from microtile 314, Blocks 4 & 5 are derived from microtile 316, Blocks 6 & 7 are derived from microtile 318), but this depends on the configuration of the texturing/shading unit. To emphasise that each shader fragment, despite the block grouping, is shaded individually, a dashed box is shown around each shader fragment in each of the blocks. As such, the contents of each dashed box can be considered to be a task instance to be processed (i.e. shaded) by texturing/shading unit 120. After shading, in this simple example, the shading results can be directly combined to form the output 332 (in which the fact that the fragments have been processed is indicated by use a different cross-hatching).

In contrast, FIG. 4 illustrates the use of a 2×2 fragment shading rate value, in which each shader fragment corresponds to 2×2 sampler fragments. The example begins in a similar way to the FIG. 3 example, with the primitives forming object 402 being determined to cover four microtiles 412, 414, 416 & 418. Again, each microtile 412, 414, 416 & 418 in the example corresponds to an array of 4×4 sample points. Again, the sampler fragment coverage within each microtile is indicated by the cross-hatching. Whilst this 4×4 sampler granularity is retained for coverage information (as will be seen later), the 2×2 fragment shading rate value means that the shader fragments and therefore the task instances for shading are created from 2×2 sets of sampler fragments, which are then grouped into blocks (Blocks 0 to 3 in FIG. 4, with Block 0 being derived from microtile 412, Block 1 being derived from microtile 414, Block 2 being derived from microtile 416, Block 3 being derived from microtile 418). As in FIG. 3, dashed boxes have been shown around each shader fragment in the blocks in FIG. 4. However, in contrast to FIG. 3, it will be seen that the content of each dashed box corresponds to four (that is: 2×2) of the original sampler fragments from microtiles 412, 414, 416 & 418. A single shader task instance is run for each dashed box. Put another way, shader fragments are created with each fragment corresponding to four original sampler fragments, and a single shading task is created for each shader fragment. As shown for one of the dashed boxes from Block 3, this produces a single shading result 422 corresponding to the original sampler fragments for which the task instance was constructed. That single shading result 422 can then be recombined with the coverage information (e.g. as shown in microtiles 412, 414, 416 & 418) to produce a set of appropriately shaded fragments 424 at the same spatial resolution as the original set of 2×2 sampler fragments (in the illustrated example, this results in a single shaded fragment at that resolution). After performing a similar process for each task instance, the shaded fragments can be combined to form the output 432. In other words, although the 'coarser' shader fragment size in this example causes sampler fragments to be grouped together to be shaded, in a way that can also cover sample points which may not actually be covered by the primitive being shaded, the shading results 422 are applied only at the sample positions known to be covered, meaning that the outputs 332 & 432 from FIGS. 3 and 4 are the same in terms of spatial coverage. However, fewer task instances need to be processed to achieve the same (in terms of spatial coverage) output, leading to greater processing efficiency. That can be seen by comparing the number of dashed boxes in the blocks of FIG. 3 compared to those in FIG. 4-FIG. 3 requires 32 dashed boxes (shader task instances) whereas FIG. 4 only requires 16. On the other hand, that processing efficiency comes at a loss of spatial resolution when determining shading results. That is, although the outputs 332 and 432 may have the same spatial coverage, there may be less variation in the shading results within the covered area in the output of FIG. 4. There may not be any difference, depending on the uniformity of the area covered, and it is thus up to the programmer to judge when such loss of spatial resolution in the shading results are an acceptable trade-off for increased processing efficiency.

It will be noted that in FIG. 3, there are some task instances (dashed boxes) in Blocks 0-6 which do not contain any sampler fragments and so do not actually require shading. Similarly, in FIG. 4, there are task instances in Blocks 0-3 which do not contain any sampler fragments that require shading. Such 'empty' or 'helper' instances can be created if the system architecture expects to receive blocks containing a certain number of task instances (e.g. 2×2 instances in the examples presented). Whilst systems such as SIMD systems are most efficient when every instance being processed is 'useful' work, the system can still operate by using such helper instances, and can still operate (overall) more efficiently that a system which does not exploit parallelism.

Figure 5A:
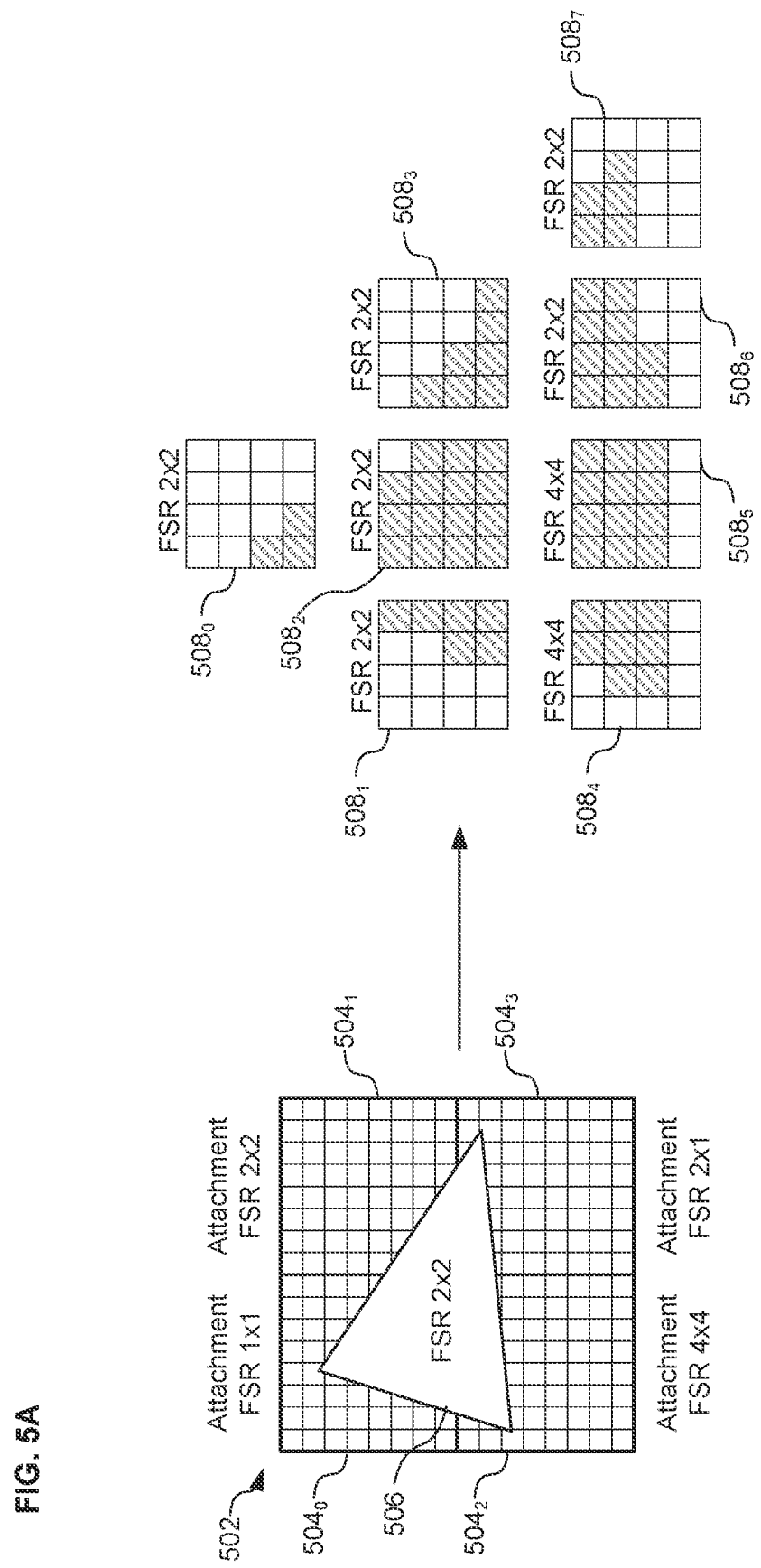
FIG. 5A illustrates how attachment FSR values can be determined for different sample points within a primitive.
Figure 5B:
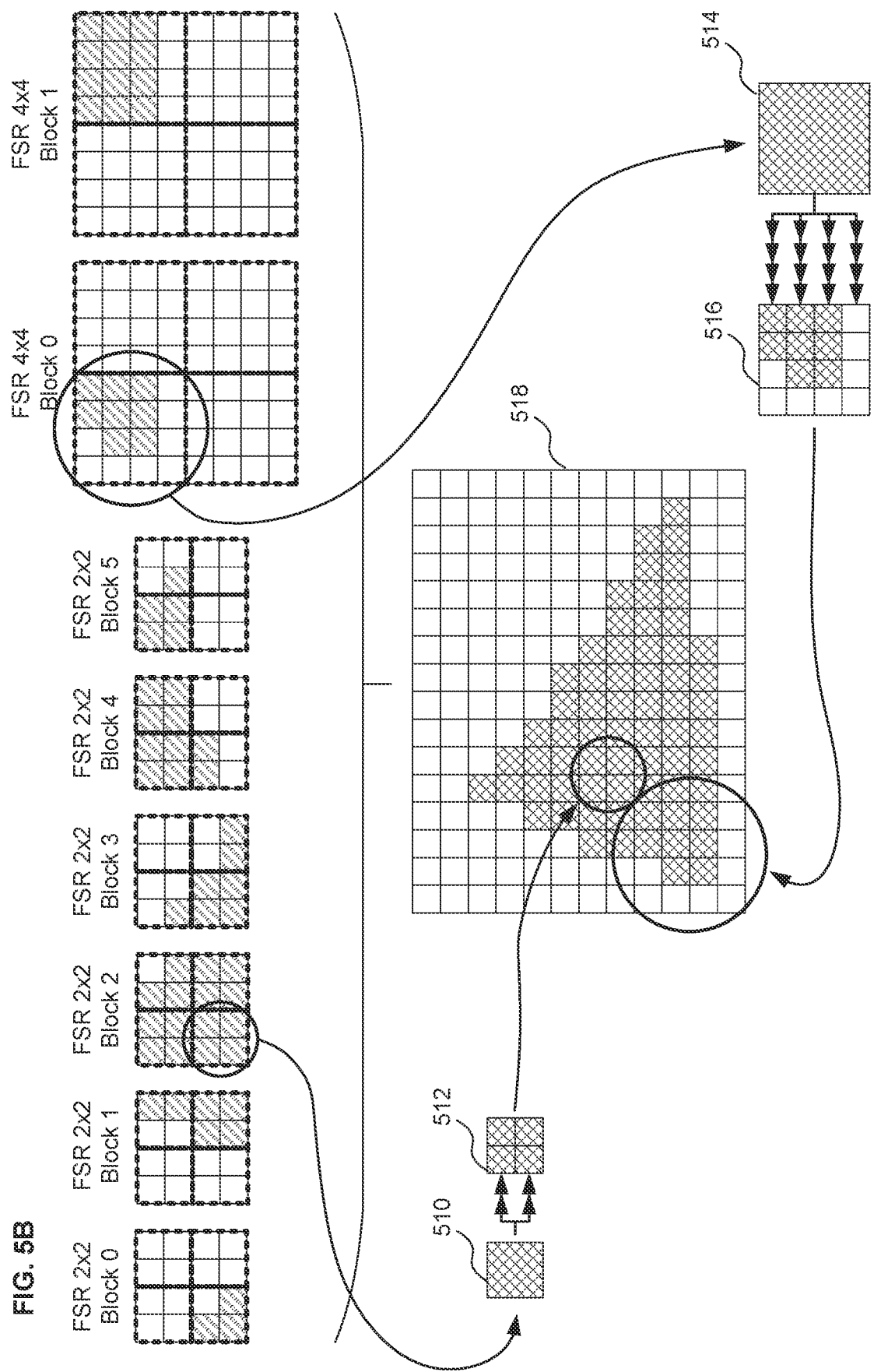
FIG. 5B illustrates how those sample points can subsequently be shaded.

FIGS. 5A and 5B illustrate (in a similar manner to how FIGS. 3 and 4 illustrated how a single FSR value interacts with a graphics processing system) how the attachment FSR technique interacts with other sources of FSR values in a graphics processing system.

In the example of FIGS. 5A and 5B, the attachment texel corresponds (or maps) to an area of 8×8 pixels, meaning that the rendering space is divided into a grid of 8×8 pixel areas, and an FSR value is specified for each such 8×8 pixel area. Those FSR values may be different or the same (although, in practice, if all the texels had the same FSR value, a larger FSR texel size would likely be more appropriate/efficient). FIG. 5A illustrates a portion 502 of a rendering space that contains four pixel areas $504_{0-3}$, and in this example each pixel area corresponds to a different attachment texel that specifies a different FSR value (the attachment texel corresponding to pixel area $504_0$ specifies an FSR value of 1×1; the attachment texel corresponding to pixel area $504_1$ specifies an FSR value of 2×2; the attachment texel corresponding to pixel area $504_2$ specifies an FSR value of 4×4; the attachment texel corresponding to pixel area $504_3$ specifies an FSR value of 2×1). The area of pixels corresponding to a particular FSR texel or value may also be referred to as an FSR region.

A triangular primitive 506 overlaps the four pixel areas $504_{0-3}$. The primitive 506 is associated with its own FSR value, which in this case is a 2×2 FSR value. This could be an FSR value as specified by one FSR source (e.g. a primitive FSR value), but it may also be an FSR value established following a combination of values from different FSR sources (e.g. primitive and pipeline FSR values). In any case, the FSR value associated with the primitive is combined with the attachment FSR value during the sampling process for the primitive. In this case, as illustrated in FIG. 5A, although the attachment texels correspond to pixel areas of 8×8 pixels, the microtile size is still 4×4 samples, and so the primitive 506 is found to overlap eight microtiles $508_{0-7}$ (and the sample coverage of the primitive 506 within each microtile is indicated by cross hatching). In turn, each microtile overlaps a pixel area corresponding to a particular attachment texel, associated with a particular attachment FSR value. For the sampler fragments within each microtile, a resolved combined FSR value (i.e. which might be a 'second' combined FSR value if the primitive's FSR value was a first, preliminary, combined value derived from combining pipeline and primitive FSR values) can be calculated based on the FSR value associated with the primitive and the FSR value of the attachment texel corresponding to the pixel area that the microtile is overlapping. So, for sampler fragments in microtile $508_0$, derived from pixel area $504_0$, the attachment FSR value is 1×1. In this example the combination operation for the attachment FSR value and the FSR value associated with the primitive is a 'maximum' combiner, so the FSR value for the for the sampler fragments in microtile $508_0$ is 2×2 (being the FSR value associated with the primitive 506, which is larger than the 1×1 FSR value of the corresponding attachment texel). With similar reasoning it can be understood how the other FSR values shown in FIG. 5A for the sampler fragments in each of the eight microtiles $508_{0-7}$ are derived. It can be seen that for many of the microtiles the resulting FSR value for the sampler fragments they contain is 2×2, but two microtiles $508_4$ & $508_5$ have an FSR value of 4×4 for the sampler fragments they contain.

It is noted that although the forgoing description relates the position of the microtiles to the attachment texels, to determine the relevant attachment FSR, in other implementations it may be the positions of the fragments themselves which are considered with respect to the attachment texels.

FIG. 5B continues the rasterisation process started in FIG. 5A. Based on the FSR values, sampler fragments from the microtiles $508_{0-7}$ illustrated in FIG. 5A are grouped into blocks of shader fragments for shading in parallel. The five microtiles with FSR values of 2×2 (microtiles $508_{0-3}$ and $508_{6-7}$) are converted to FSR 2×2 Blocks 0-5 in FIG. 5B. As in FIGS. 3 and 4, a dashed box is shown around each shader fragment in each of the blocks. In addition, the two microtiles with the 4×4 FSR value (microtiles $508_4$ & $508_5$) are converted to FSR 4×4 Blocks 0 & 1 in FIG. 5B. Again a dashed box is shown around each shader fragment within that block.

As previously discussed with respect to FIGS. 3 and 4, a single shader task instance is run for each dashed box. As shown for one of the dashed boxes from FSR 2×2 Block 2, this produces a single shading result 510 corresponding to the original sampler fragments for which the task instance was constructed. That single shading result 510 can then be recombined with the coverage information from original microtile $508_2$ to produce a set of appropriately shaded fragments 512 at the same spatial resolution as the original set of 2×2 sampler fragments. In this case, all four of the sample points to which the task instance corresponds are found to be covered by the primitive, so four shaded fragments are obtained. In contrast, one of the dashed boxes from FSR 4×4 Block 0 is shown to produce a single shading result 514 corresponding to 16 sample points that were not all covered by the primitive for which the task instance was constructed. In this case the primitive only covered eight of the 16 sample points to which the task instance corresponded, so when the single shading result 514 is recombined with the coverage information from original microtile $508_4$ it produces eight fragments shaded in accordance with the single shading result 514, but at the spatial resolution of the original sampler fragments. After performing a similar process for each task instance, the shaded fragments can be combined to form the output 518.

It will be understood that although, compared to FIGS. 3 and 4, the introduction of the attachment FSR technique opens up the possibility of different FSR values for different parts of the same primitive, once the FSR values for individual fragments have been determined the process is much the same as previously described. In other words, although the coarser fragment size (compared to shading each sample point individually) causes sampler fragments to be grouped together to be shaded, in a way that can also cover sample points which may not actually be covered by the primitive being shaded, the shading results 510 and 514 are applied only at the sample positions known to be covered. This means, fewer task instances need to be processed to achieve the shading output, leading to greater processing efficiency.

However, it can be observed that in FIG. 3 the eight blocks contain fifteen 'empty' or 'helper' task instances out of a total of 32 task instances, whilst in FIG. 4 there are eight helper task instances out of a total of 16 (as indicated by the dashed boxes). In other words, the fraction of helper tasks in the task instance pool has risen from FIG. 3 to FIG. 4. This apparent decrease in efficiency can be more than counteracted by the fact that each (useful) task instance processed contributes to shading more than one sampler fragment, meaning the system is still more efficient in terms of processing the incoming work more quickly. However, considering the system is processing very large numbers of primitives, this increase in helper task instance usage has been identified as an opportunity to make further efficiency savings. In particular, the issue becomes even more significant when considering the situation where coarser FSR rates are used. In FIG. 5A, microtiles $508_4$ and $508_5$ are the only microtiles associated with an FSR value of 4×4 rather than 2×2. Each of those microtiles, if they had an FSR value of 2×2, would have generated four fragment task instances, and thus each would have created one block of fragment task instances without any helper task instances. In contrast, as shown in FIG. 5B, each of those microtiles actually creates one fragment task instance, and thus one block of fragment task instances with three helper task instances. So, these blocks contain only one quarter 'useful' work compared to being completely 'useful' work if they had been processed at an FSR value of 2×2.

In other words, at an FSR value of 1×1, a 4×4 sample microtile contains up to 16 task instances ('up to' because not every sample position is necessarily covered by a primitive) from which to construct the instance blocks. In contrast, at an FSR value of 2×2 there are only up to 4 task instances and at an FSR value of 4×4 there can only be one task instance. So, as the fragments get coarser, there are fewer fragments per microtile, and therefore fewer task instances to gather from the microtile into an instance block. This issue becomes further magnified when anti-aliasing is taken into account. For example, at an FSR value of 2×2 with a 4× anti-aliasing rate (i.e. doubling the number of sampler fragments in both the height and width directions) a microtile would again only include one fragment and thus one task instance. Since both the FSR value and anti-aliasing can affect the number of samples required per pixel, for simplicity the examples discussed below are assumed to have no anti-aliasing. The skilled person will readily understand that the anti-aliasing setting, in the absence of FSR, does not cause the issue of reduced numbers of task instances per microtile. The skilled person will also readily understand how anti-aliasing can affect the number of samples per task instance, and thus the number of task instances in a microtile, for FSR values greater than 1×1.

To address the issue of reduced task instances per microtile, it is worth first further understanding the formation of the instance blocks from the microtiles in greater detail. These instance blocks may also be known or referred to as 'quad-fragments', due to the fact that they relate to four neighbouring fragments—i.e. they relate to a group of 2×2 adjacent fragments. In any case, part of the reason it is beneficial to form the instance blocks from groups of 2×2 adjacent instances is to assist with performing certain calculations during shading. For example, it is often necessary to compute a delta value for a parameter, be that a difference or gradient for the parameter, at the particular position of a fragment (e.g. perhaps a depth gradient when mapping a texture) and such deltas cannot be determined from the information at a single location. If each task instance were processed totally independently, computing a delta would require retrieving additional information about other positions whilst processing the task instance (which would incur processing delay), or require including such information in the original task instance (which would increase the size of every task instance, and thus the amount of information being transferred through the system). However, by grouping and processing blocks of adjacent instances together, the information about surrounding positions becomes readily accessible from the other instances in the block, and therefore the computation of deltas becomes more efficient. When there are not enough adjacent instances to fill an instance block, helper instances can be created containing information to assist in the computation of the deltas. Of course, SIMD processors are often able to process more than four instances of a task in parallel, and so the instance blocks may be further grouped together into larger shading tasks that process multiple instance blocks (and thus task instances from multiple instance blocks) in parallel. The further grouping of instance blocks into larger shading tasks may be based, at least in part, on whether the blocks relate to the same fragment shader (i.e. so the instance blocks within a given larger shading task all relate to the same fragment shader). Some systems may apply further criteria for the grouping, based upon some other state associated with the instance blocks (e.g. perhaps derived from state information associated with the primitive blocks from which the task instances in the instance block are derived). In such situations, it will be appreciated that there may be multiple larger tasks created that relate to the same fragment shader but differ in respect to the other state. In other words, whilst all instances within a larger shading task may relate to the same fragment shader, that does not preclude there being other larger shading tasks that relate to that same fragment shader. In any case, this further grouping does not affect the delta computations, as only whole blocks are combined into the larger tasks.

To make this approach possible in a pipelined system, it is efficient to supply task instances to be processed in a manner that collects instances of a same task (i.e. instances of a same fragment shader operating on different shader fragments) together. This is part of the reason why it is beneficial for the sampling unit 117 to issue microtiles to the texturing/shading unit 120—it collects together task instances in a way that preserves the spatial arrangement of the fragments. This then makes it possible to subsequently group together adjacent task instances into the instance blocks.

It should be noted that whilst FIGS. 3, 4 & 5A illustrate the microtile coverage of a single primitive, in practice a microtile may contain sampling results from different primitives (i.e. because different primitives are visible in different areas of the rendering space corresponding to the microtile). If the different primitives require the same fragment shader, then in some implementations the samples may be collected into the same instance block. However, if the different primitives require different fragment shaders then, when the microtile is processed to create the instance blocks, the instance block formation may take this into account by separating sampler fragments relating to primitives with different fragment shaders into different instance blocks. In other words, even though the microtiles may contain sampler fragments relating to different fragment shaders, the instance blocks created will each relate to a single fragment shader. This may result in more instance blocks being created from the microtile than if e.g. all the sampling positions within the microtile are covered by the same primitive, with the same fragment shader.

For example, a microtile measuring 4×4 sampling points, entirely covered by a single primitive, would lead to 4 2×2 instance blocks (for an FSR value of 1×1). If the microtile was exactly half-covered (e.g. the left half) by a first primitive and half covered (e.g. the right half) by a second primitive requiring a different fragment shader, then 4 2×2 instance blocks would also result (as the instance blocks would correspond to top-left, top-right, bottom-left and bottom-right quarters of the microtile, and each quarter is only covered by one primitive). However, if the first primitive covered all but one sample point in the microtile, with the second primitive covering the final one sample point, this would lead to 5 2×2 microtiles—each quarter solely covered by the first primitive would lead to one instance block, whilst the remaining quarter would generate two instance blocks, one for the samples from the first primitive and one for the sample from the second primitive (e.g. along with three helper instances).

One aspect of the present approach relates to identifying that the system of creating instance blocks can be further extended, to reduce the number of helper instances required, and thus increase the overall efficiency, when processing coarser fragments. By creating instance blocks from instances derived from not just a single microtile, there is greater opportunity to fill an instance block with 'useful' work.

Figure 6:
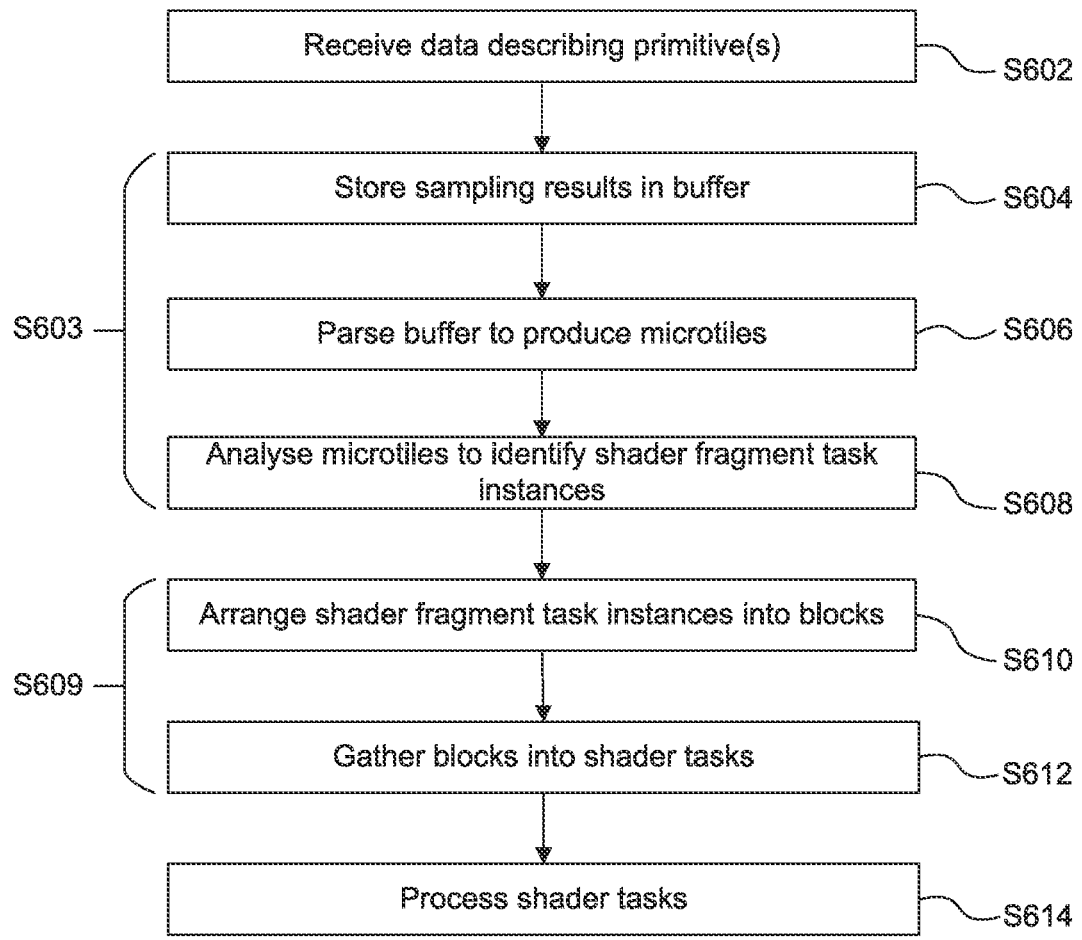
FIG. 6 shows a method of how primitives can be converted to fragments and shaded.

FIG. 6 illustrates an example method according to this approach. The method could be performed in a rendering phase of a tile based system as discussed above.

At step S602, data describing a primitive is received. For ease of understanding only one primitive is considered, but it will be understood that the primitive could be received as one of a plurality of primitives, which could each be processed in a similar manner. The data could be received by the rendering logic in the form of a primitive block, retrieved from a memory separate to the rendering logic. Data is also received describing one or more fragment shading rates associated with the primitive. As explained above, that data may be received in the same way as the data describing the primitive (e.g. as part of the information in a primitive block) or may be provided separately (e.g. as an FSR attachment).

At step S603, shader fragment task instances to be shaded are identified from the primitives indicated in the data received at step S602. As shown in FIG. 6, step S603 can be further divided into three steps S604, S606 and S608.

At step S604, the results of sampling are stored in a buffer (e.g. within the sampling unit). This can occur as part of a rasterisation process, in which the primitives are sampled and optionally hidden surface removal is performed. The buffer corresponds to a region of the rendering space, for example a tile in the tile-based approach discussed above, and is used to store the results of sampling before shading and texturing. The sampling results can be sampler fragments for the primitive, each sampler fragment corresponding to a sample position within the render space is overlapped by the primitive. Considering multiple primitives, each primitive will be subject to the sampling process and, as such, the buffer may store sampling results from multiple primitives.

At step S606 the buffer is parsed to produce microtiles. This is discussed in greater detail below, but may be part of flushing a buffer so it may be re-used. However, in summary, each microtile output from this step corresponds to an array of sample positions within the region. According to this aspect, each microtile contains samples to be shaded with a common fragment shading rate—that is, within one microtile the same fragment shading rate is to be used for all samples contained therein, but another microtile (potentially corresponding to the same overall area of the rendering space as the former microtile) may contain samples that are all to be shaded with a different fragment shading rate.

At step S608, the microtiles are analysed to identify shader fragment task instances to be shaded. Again, this is discussed in greater detail below. However, in summary, the number of shader fragment task instances in a microtile can vary. A shader fragment, to be shaded as a single shader fragment task instance, may cover multiple sampler fragments. As such a microtile covering 16 (i.e. 4×4) sampler fragments from a single primitive may contain fewer than 16 shader fragments. For example, if the FSR value for the sampler fragments in the microtile is 4×4, the result of analysing the microtile will be that only one shader fragment, and thus a single shader fragment task instance, is identified. In other circumstances, for example if the microtile contains sampler fragments from different primitives, there may be multiple shader fragments and they may require different fragment shader programs.

At step S609, fragment task instances requiring a common fragment shader program are combined into a shading task. As explained above, some systems may apply further criteria to the step of combining task instances into a shading task, e.g. based upon some other state associated with the instances. In other words, this step does not require that all instances with the same fragment shader are combined into the same shading task. Instead, it should be understood that all the instances contained in a given shading task produced by this step relate to the same the same fragment shader, but that there may be multiple shading tasks that relate to the same fragment shader. In any case, as shown in FIG. 6, step S609 can be performed in two steps S610 and S612.

At step S610, the shader fragment task instances are arranged into blocks. As explained above, this arrangement of instances of a particular type of task (e.g. requiring a particular fragment shader) helps with processing the task instances in parallel, such as in a SIMD processor. The block collects instances of tasks of the same type, which can then be processed together. In one approach, the shader fragment task instances in a given block would be derived from the same microtile but as discussed above, according to one aspect of the present approach, whilst that may still occur the system is not limited to creating blocks in that way—in other words, at least one block of the shader fragment task instances so created may comprise shader fragment task instances from more than one microtile (with those different microtiles being derived from the same parsing step, i.e. from different parts of the same buffer content).

At step S612, the blocks of shader fragment task instances may then be gathered into shader tasks. That is, blocks of shader fragment task instances which relate to the same fragment shader can be gathered together in a task to be processed in parallel. The blocks gathered into the same task may be derived from the same primitive or may be derived from different primitives which call the same fragment shader. As explained above, multiple tasks may be created that relate to the same fragment shader if other criteria are also used to determine which blocks to include in the same task.

Finally, at step S614, the shader tasks are processed, e.g. by texturing/shading unit 120 in the example system described, to produce shaded fragments. In other words, the blocks of shader fragment task instances within a task are shaded in parallel to produce shaded fragments.

However, forming instance blocks by randomly combining fragment shader task instances from different microtiles (with the same FSR value) into blocks is not the most efficient option.

Figure 7:
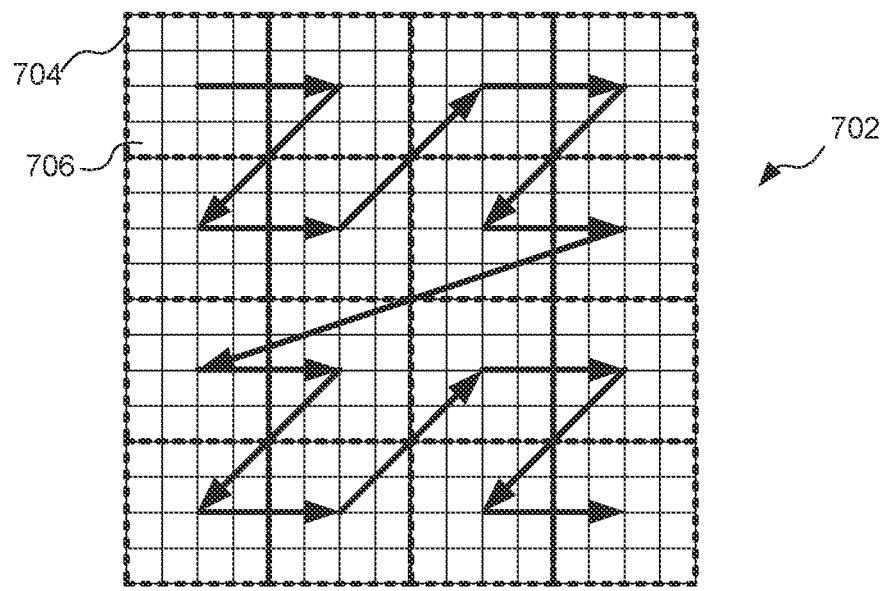
FIG. 7 illustrates an example order in which microtiles can be generated from sections of a buffer.

Rather, to further increase the opportunity for fragment instances from different microtiles to be assembled in the same block in a way that facilitates the delta calculations during shading and texturing, the microtiles can be issued in an order that preserves the locality of the microtiles, such as a Z-order or Morton order. FIG. 7 illustrates an example of such an order.

FIG. 7 schematically illustrates a buffer 702 (e.g. maintained by the sampling unit 117) corresponding to at least a part of the rendering space. For example, in the tile based system described above, the buffer 702 can correspond to a tile. It is noted that the buffer 702 is, in practice, an area of memory, and may store values in a different way to the 2D layout shown in FIG. 7, which depicts the buffer in a manner that assists with understanding.

The example buffer 702 is shown as being divided into an array of 4×4 (i.e. 16) sections 704, each outlined in FIG. 7 with a thick dashed line, from which microtiles are created and issued to the texturing/shading unit 120. Each section 704 can store the results of sampling at an array of sampling positions—i.e. a sampler fragment 706 corresponding to each sampling position, outlined by thin continuous lines in FIG. 7.

In the depicted example, a section 704 corresponds to an array of 4×4 (i.e. 16) sampling positions with corresponding sampler fragments 706. However, it should be noted that a sampler fragment 706 is not necessarily present for each sampling position—i.e. there can be sampling positions which are not overlapped by any primitives and therefore for which no sampler fragments are generated. As such each section may contain differing numbers of sampler fragments 706, up to a maximum being the number of sampling positions corresponding to the section (16 in the example of FIG. 7).

A microtile is only created for a section 704 containing sampler fragments 706. Then, according to the present aspect, a microtile is issued for every FSR value associated with those sampler fragments 706. For example, if all the sampler fragments 706 have the same FSR value, then only one microtile will be issued, but if different sampler fragments 706 have different FSR values then multiple microtiles will be issued, one for each different FSR value. In this way, should primitives contribute sampler fragments 706 with different FSR values to a particular section 704 of the buffer 702, the sampler fragments within that section 704 will be separated into different microtiles. As a result, each microtile itself comprises an array of (up to) 4×4 (i.e. 16)

sampler fragments with a single FSR value (but potentially relating to different fragment shaders, as discussed above).

The arrows in FIG. 7 illustrate an example order in which microtiles generated from the sections 704 can be issued for shading. As mentioned above, this is a type of Morton order or Z-order, which preserves the locality of the microtiles. However, similar locality preserving orders could be used in other examples (e.g. using an N-order). By following such an order for each FSR value in turn, the locality of microtiles with the same FSR value is maintained, facilitating the possibility that task instances from different microtiles can be gathered together into instance blocks.

Figure 8:
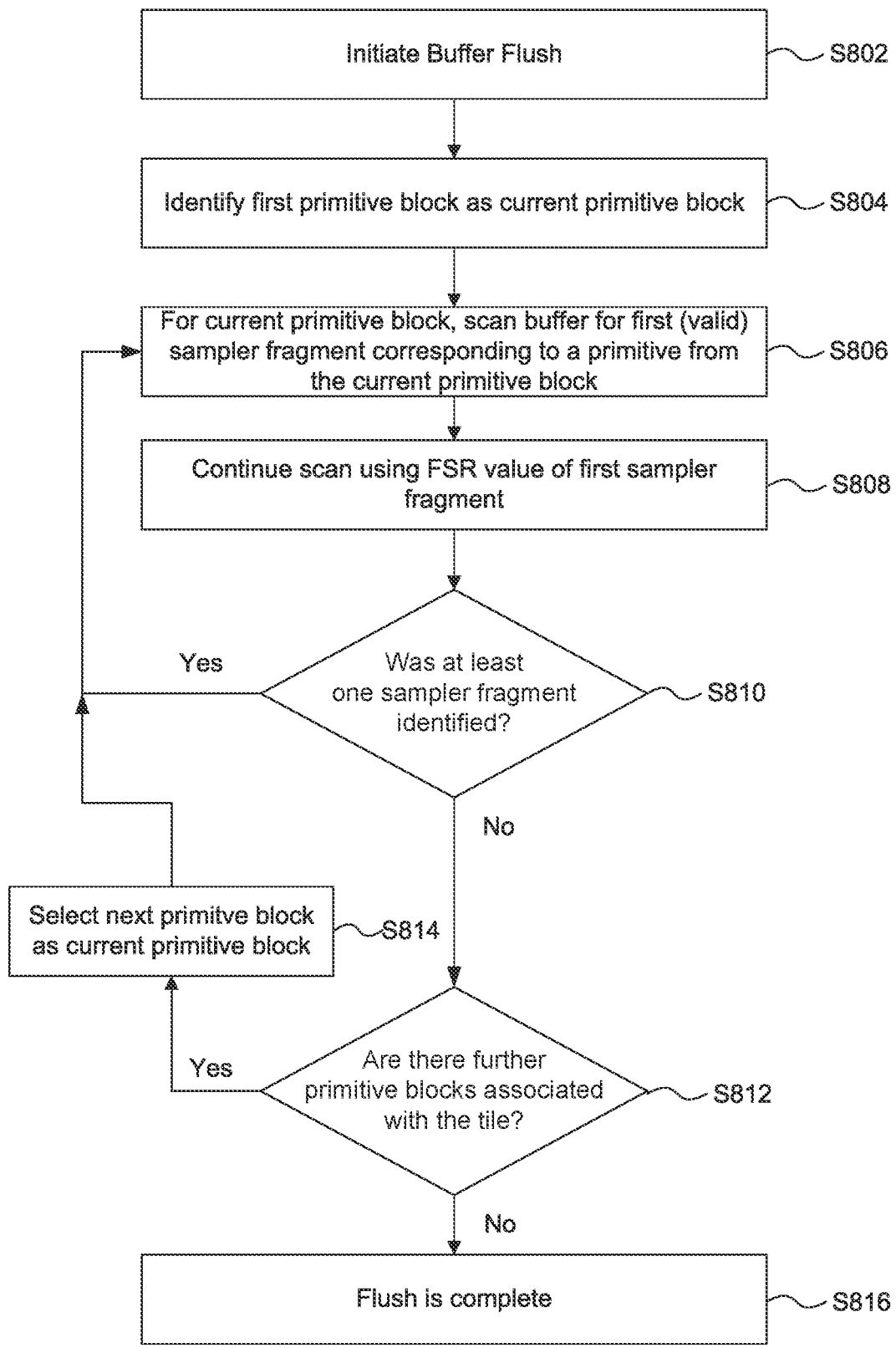
FIG. 8 shows a method for generating microtiles.

FIG. 8 shows an illustrative method for generating the microtiles. That is, FIG. 8 is an example method for performing step S606 of FIG. 6.

FIG. 8 starts at S802, when it is time to flush the buffer 702. The buffer is then traversed, or parsed, to produce the microtiles. An efficient way to do this in terms of memory access, in the tile-based system described above, is to consider the buffer primitive block by primitive block (although this is only an example, and need not be the case—instead sampler fragments may be collected into microtiles without regard to the primitive blocks). Therefore the first primitive block associated with the tile is identified, S804, for example from a control list for the tile associated with the buffer 702.

A first pass is then begun, in which the buffer 702 is traversed to identify sampler fragments corresponding to primitives stored in that primitive block. When a first sampler fragment corresponding to that primitive block is identified, S806, the FSR value for that sampler fragment is determined and the pass continues, S808, constrained to finding sampler fragments with that same first FSR value (and still from the same primitive block), and any identified sampler fragments are issued as microtiles. In some cases, the process of identifying sample fragments and issuing microtiles, corresponding to steps S806 and S808, may be further divided into a two stage process in which a relevant set of primitives in the buffer is first identified (e.g. a group of primitives from the same primitive block) and then relevant (i.e. with the same FSR value) sampler fragments for that set of primitives are identified and issued as microtiles. This can reduce the total number of primitives contributing to a particular microtile, which in turn can reduce the number of different fragment shaders the contents of a given microtile might relate to. This can therefore assist with the later grouping of the shader fragments.

Once the pass is complete, and assuming at least one sampler fragment was identified, S810—"Yes", the buffer is scanned again looking for further sampler fragments corresponding to primitives from the first primitive block. In this scan, the sampler fragments from the previous scan are no longer considered 'valid' and so are not re-identified.

As long as such further sampler fragments are present, the process will continue to iterate through steps S806 to S810 to perform repeated scans of the buffer. In each iteration the FSR value of the first valid sample identified from the relevant primitive block will be used to constrain the rest of that pass, until no more samples corresponding to that primitive block are identified.

In that case, S810—"No", if there is another primitive block associated with the tile, S812—"Yes", the next primitive block will be selected, S814, and the process will again iterate through steps S806 to S810 for that next primitive block. Eventually, when there are no more primitive blocks left, S812—"No", the flush of the buffer is complete, S816.

Figure 9:
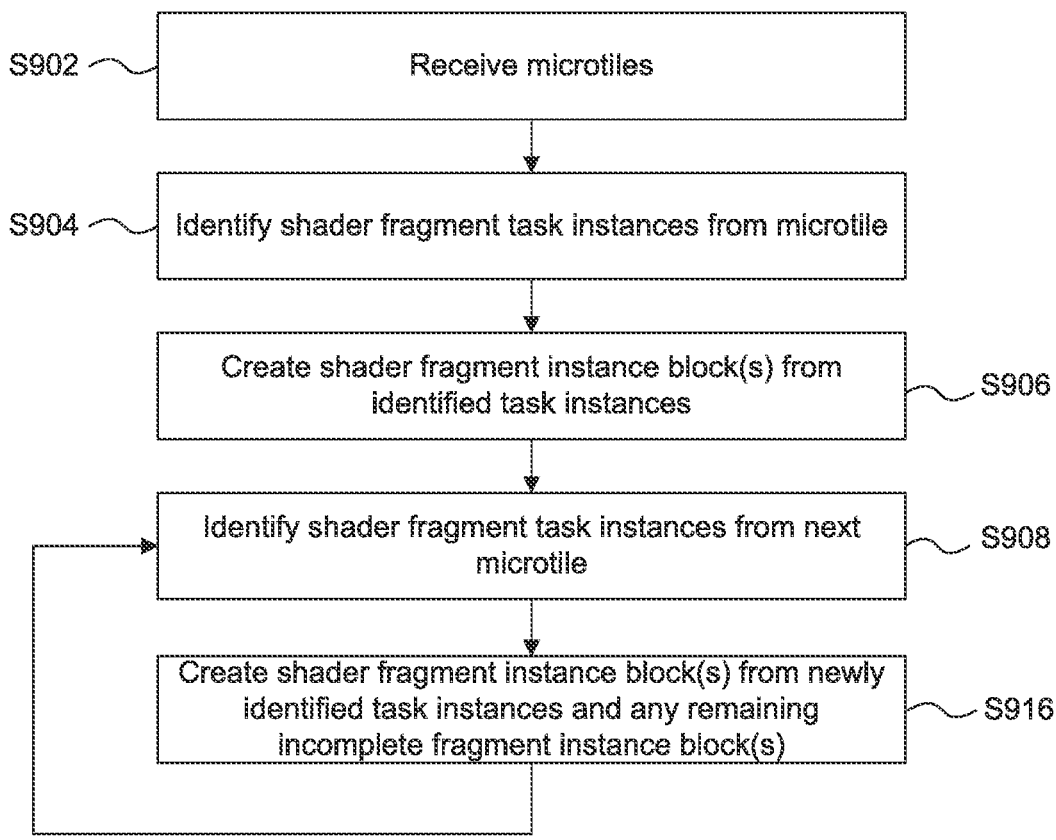
FIG. 9 shows a method of processing microtiles to create blocks of shader fragment task instances.

As such, the result of flushing the buffer 702 is a stream of microtiles. In the example described, the result of the constraint to perform each pass for a particular FSR value means that microtiles of the same FSR value are issued together (amongst the microtiles relating to each particular primitive block, if the search was also constrained to be performed on a per-primitive block basis). These microtiles are then received by the texturing/shading unit 120 in the same order. FIG. 9 shows an example method of how those microtiles are processed by the texturing/shading unit 120 to create blocks of shader fragment task instances, representing steps S608 and S610 of FIG. 6 in greater detail.

The method of FIG. 9 starts with receiving the microtiles at S902. For the purposes of this example, it is assumed that the received microtiles have the same FSR value, and the method of FIG. 9 is shown as a continuous process, although it will be appreciated that the process will come to an end should there be no more microtiles to process (e.g. because of a change of FSR value, in which case the method of FIG. 9 can be repeated for that batch, or because all available microtiles have been processed).

The next step is to analyse a microtile (as in S608) to identifying shader fragment task instances, S904. For the purposes of the first iteration it is assumed that the microtile has a different FSR value to the previously processed microtile. Using the FSR value associated with the microtile, and the anti-aliasing setting when applicable, the texturing/shading unit 120 can group the sampler fragments to create shader fragments of the appropriate size, from which the shader fragment task instances are then generated. Where a shader fragment would otherwise only cover empty sample positions (i.e. where no sampler fragments were present), a shader fragment is not generated.

The shader fragment task instances are then grouped (as in S610) into one or more (complete or incomplete) shader fragment instance blocks, S906. In an example, each block is a block of 2×2 (i.e. 4) task instances. The number of blocks will depend on the number of shader fragment task instances identified in S904, which in turn will depend upon the number of sampler fragments and the FSR value associated with them (and thus the microtile).

It is possible that processing a single microtile may produce one or more complete shader fragment instance blocks (if the microtile is entirely covered by only a few primitives and the FSR value is low—e.g. an FSR value of 1×1 could produce four fragment task instances from a 4×4 microtile covered by a single primitive), and any complete blocks can then be issued for processing. However, in other situations it may be impossible for one microtile to produce enough task instances arranged in the appropriate way to fill a block—e.g. a 4×4 microtile with an FSR value of 2×4, even if entirely covered by a single primitive, will only produce two task instances; and the same 4×4 microtile with an FSR value of 1×4 will produce four task instances but not arranged in a 2×2 block. In such cases it may be possible to complete the block with task instances from the next microtile(s), so it cannot yet be determined whether to issue the incomplete block.

Figure 10:
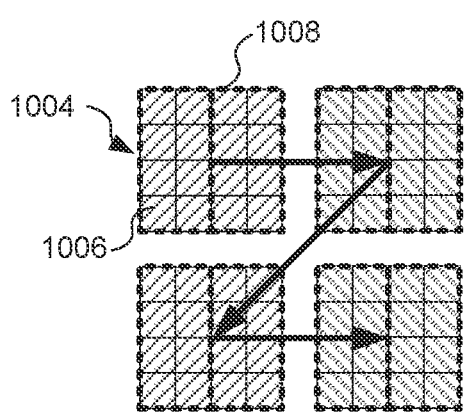
FIG. 10 illustrates a sequence of microtiles with an FSR value 2×4.
Figure 11:
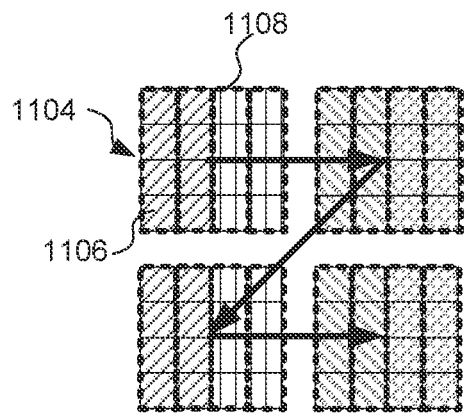
FIG. 11 illustrates a sequence of microtiles with an FSR value of 1×4.

FIGS. 10 and 11 illustrate this point visually. In FIG. 10, four microtiles 1004 being processed with an FSR value of 2×4 are shown. The order in which they are issued (i.e. read out from the buffer 702) is illustrated by the arrows. Dashed lines are used to indicate a group of sampler fragments 1006 that correspond to a shader fragment 1008. The shader fragments are filled with different patterns to indicate the different shader fragment instance blocks that may be formed. In this case, the four shader fragments from the two leftmost microtiles can form a 2×2 block (indicated by a fill pattern with lines sloping up to the right), whilst the four shader fragments from the two rightmost microtiles can form another 2×2 block (indicated by a fill pattern with lines sloping down to the right). As such, after processing the first (i.e. top left) microtile 1004 (and assuming all shader fragments are present and relate to the same fragment shader), there will be one incomplete block; processing the second tile will start a new block, whilst it remains possible to complete the previous block; processing the third tile will complete the first block; and processing the fourth microtile will complete the second block.

Similarly, in FIG. 11, four microtiles 1104 are being processed with an FSR value of 1×4. Again, dashed lines are used to indicate a group of sampler fragments 1106 that correspond to a shader fragment 1108. The shader fragments are filled with different patterns to indicate the different shader fragment instance blocks that may be formed. In this case, the two left-most shader fragments in each of the two leftmost microtiles can form a 2×2 block (indicated by a fill pattern with lines sloping up to the right), the two right-most shader fragments in each of the two leftmost microtiles can form a 2×2 block (indicated by a fill pattern with vertical lines), the two left-most shader fragments in each of the two rightmost microtiles can form a 2×2 block (indicated by a fill pattern with lines sloping down to the right), the two rightmost shader fragments in each of the two rightmost microtiles can form another 2×2 block (indicated by a fill pattern with crossed lines). As such, after processing the first (i.e. top left) microtile 1104 (and assuming all shader fragments are present and relate to the same fragment shader), there will be two incomplete blocks; processing the second tile will start two further blocks, whilst it remains possible to complete the previous blocks; processing the third tile will complete the first two blocks; and processing the fourth microtile will complete the remaining two blocks.

So, returning to FIG. 9, at step S906 any complete shader fragment instance blocks can be issued, but any incomplete blocks that may be completed by subsequent shader fragments from subsequent microtiles may be kept pending. Of course, it is still possible for situations to occur in which some blocks cannot be completed, for example if not all possible shader fragments are present in the relevant microtiles (i.e. because the relevant sample points are not covered by a relevant primitive). As such, it remains possible for the system to issue incomplete blocks (with helper instances) in these circumstances. But by enabling the construction of shader fragment instance blocks the frequency of such scenarios is much reduced compared to a situation in which only task instances from a single microtile can be used to construct a shader fragment instance block.

The method then moves on to analyse the next microtile, S908, and the shader fragment task instances from that microtile are identified in a similar way to step S904. The method then moves to step S910, which is similar to step S906 except for the fact that there may already be incomplete blocks. Thus, in this step, shader fragment instance blocks are created from both the newly identified task instances and the incomplete blocks from the previous step. In some cases it may be possible to add newly identified task instances to a previously incomplete block which may complete the block or may not. For example, in the case of 4×4 microtiles and a 4×4 FSR value, each microtile will only create one shader fragment, and—assuming all shader fragments relate to the same fragment shader—the first microtile in a sequence will start a new incomplete block, the second and third microtiles will each add a further task instance to the incomplete block without completing it, and the fourth microtile will add the final fourth task instance that completes the block. In other cases, there may be existing incomplete blocks that cannot be added to, and additional incomplete blocks are created (the situation, for example, when processing the second microtile in each of FIGS. 10 and 11). In still other cases, there may simply be no incomplete blocks from the previous step. In any case, any completed blocks are issued, as are any incomplete blocks that will not be completed (as discussed above, e.g. because of empty/missing shader fragments due to lack of primitive coverage), whilst any incomplete blocks that may still be completed are kept pending.

The method then returns to step S908, cycling through steps S908 and S916 until all the microtiles are processed (at which point any remaining incomplete blocks may also be issued). As mentioned above, this may be because the next microtiles relate to a different FSR value, in which case the method can start again, separately, for those microtiles.

As a result, the texturing/shading unit 120 can group shader fragments into shader fragment instance blocks containing fewer helper instances. As these blocks are then grouped to form larger tasks to be processed by the texturing/shading unit 120 (e.g. in a SIMD processor), this allows more useful work to be performed in parallel and thus contributes to a faster and more efficient processing.

Another way of developing the instance block approach to shading, in the context of FSR, is to allow instance blocks with different FSR values to be combined into the same larger task.

In a system that doesn't account for FSR, a SIMD shading processor might expect not only that the task instances within an instance block would relate to a single fragment size, but also that each instance block would relate to fragments of the same size. That is, in the absence of FSR, the fragment size over a render would be invariant (although it might vary from render to render, e.g. subject to anti-aliasing) and so it is relatively easy to combine instance blocks into larger tasks in a way that efficiently uses the full width of the SIMD processor. In that case, shading processes such as interpolation, which rely on the sampling pattern used to create the fragments, can be performed easily and reliably. This can be done, for example, by providing information defining a single sampling pattern, used by all the instance blocks collected into the task, as part of the overall task information. That information can then be used for all the fragments being processed in parallel. However, introducing FSR complicates this.

In one approach, only instance blocks relating to the same FSR value might be combined into larger tasks and thus run in parallel. This approach is facilitated by the example method of FIG. 8, which creates microtiles from the buffer on an FSR-by-FSR basis, which in turn leads to shader fragment instance blocks being created in batches having the same FSR value, which in turn makes it easy to gather shader fragment instance blocks having the same FSR value into a task. This has the benefit of requiring relatively little change to how the tasks are submitted to the processor, as each fragment within the collected blocks would be the same size, similar to the conventional system. This means operations that rely on the fragment size or sampling pattern, such as interpolation, can still be handled by providing information defining a single sampling pattern, used by all the instance blocks collected into the task, as part of the overall task information. However, the drawback of this approach is that it becomes more difficult to collect enough instance blocks together to keep the processor efficiently busy. That is, even though the example of FIG. 8 leads to shader fragment instance blocks being created in batches having the same FSR value, there may still be a relatively small number of shader fragment instance blocks with a particular FSR value (e.g. compared to a situation where there is no variable FSR/all fragments are the same size). It may therefore be difficult to create full tasks, or it may at least be more frequent that a task cannot be completely filled (i.e. to take advantage of the processor parallelism to the greatest extent). In other words, it is more efficient to submit a single task composed of four instance blocks than to submit two tasks each composed of two instance blocks, but the latter situation becomes more likely if there are multiple FSR values and blocks with different FSR values must be kept in separate tasks.

Therefore, another approach is to create tasks that include task instances relating to different fragment sizes. This can be done by grouping instance blocks relating to different fragment sizes into the same task for processing. However, this then impacts processes such as the aforementioned interpolation, which rely on the fragment size and/or sampling pattern, as now the instances within a task can be of different sizes with different sampling patterns. Therefore, the present approach provides the relevant information (e.g. the FSR value, from which the sampling pattern and fragment size can be derived) in a way that enables each task instance to be processed irrespective of the fragment size. In particular, the relevant information can be provided at a per instance block granularity.

It might be considered that the greatest flexibility would be achieved by allowing fragments of different sizes to be included within an instance block, and then providing the relevant information about sample size and sampling pattern at the task instance granularity. However, defining the information at a higher granularity has drawbacks. In particular, there is a data (and thus bandwidth) overhead, because there is extra data to be transmitted as part of every task, and thus the size of each task is increased. This can be a significant overhead for large SIMD widths, and can be particularly significant in devices such as mobile devices where memory and bandwidth are at a premium. Moreover, allowing different fragment sizes to be present within an instance block also complicates issues such as the delta calculations mentioned above. For these reasons, a preferred implementation is to provide the sampling information at a per instance block granularity, with the task instances within a given instance block all having the same fragment size. This enables the creation of larger tasks (i.e. combining more instance blocks together) whilst minimising the extra data overhead and avoiding the need for more extensive changes to existing systems. This enables the processing of fragment task instances associated with different fragment shading rates in parallel using the common shader program, i.e. they may be processed simultaneously in the SIMD processor. That is, fragment task instances associated with different fragment shading rates may be present in different lanes of the SIMD processor.

Figure 12:
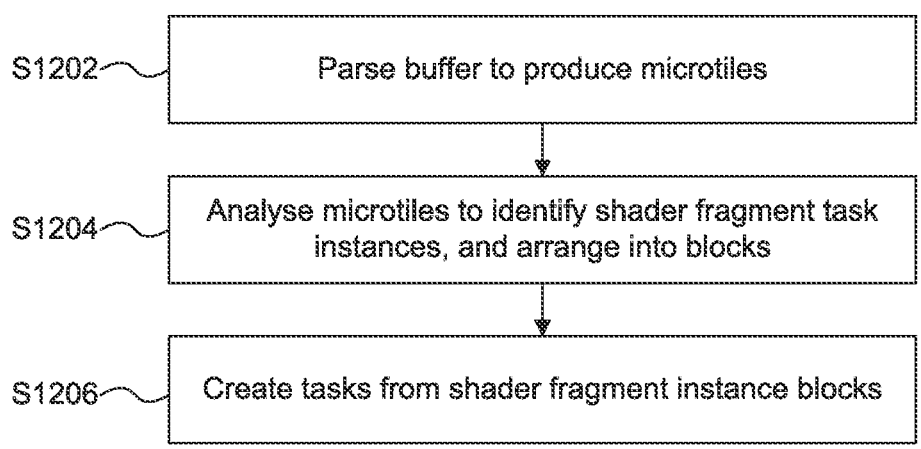
FIG. 12 illustrates a method of combining fragment shader instance blocks into shader tasks.

FIG. 12 illustrates a method of combining fragment shader instance blocks, which each individually contain tasks related to a particular FSR value, into a task that includes task instances relating to different fragment sizes.

The FIG. 12 method starts, S1202, from the point at which a buffer (e.g. buffer 704) is parsed into microtiles to be sent to the texturing/shading unit 120, which is equivalent to sub-step S606 of step S603 in FIG. 6. FIG. 8 presented one example for implementing this parsing in more detail. For the purposes of this example, it suffices to note that, in comparison to the FIG. 8 example, it is of less benefit to perform different scans of the buffer for different FSR values. That is because the separate passes of FIG. 8 contribute to the creation of fragment instance blocks in batches, as explained above, but that is not so important if the eventual tasks can be composed of blocks related to different FSR values. In addition, the separate FSR passes can lead to sampler fragments related to the same primitive being separated in the stream of issued microtiles, making it less likely that the shader fragments, created from those sampler fragments later in the pipeline, can be collected into the same task. So, by parsing the buffer without regard to FSR value, sampler fragments related to the same primitive are more likely to be grouped together in the same microtile, making it more likely the shader fragments derived from those samples can be grouped (via their corresponding shader fragment task instance blocks) into the same task. That is, this contributes to creating better-filled tasks.

Figure 13:
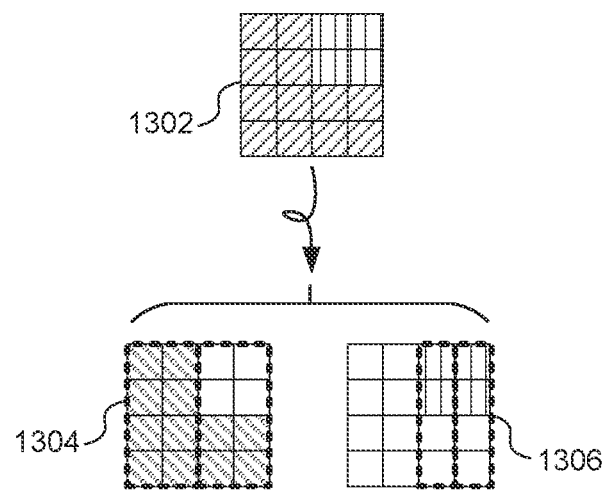
FIG. 13 illustrates how shader fragments are derived from a microtile containing sampler fragments with different FSR values.

The produced microtiles are sent to the texturing/shading unit 120, where they are analysed to identify shader fragment task instances which are then arranged into blocks, S1204. This is equivalent to steps S608 (a sub-step of step S603) and S610 (a sub-step of step S609) in FIG. 6, for which FIG. 9 presented one example implementation in more detail. For the purposes of this example, it suffices to note that an effect of having multiple FSR values in the same microtile is that shader fragments of different sizes (i.e. relating to different FSR values) may be identified from the same microtile. This in turn may make it desirable to make a larger memory/buffer provision at this step, to allow more shader fragment instance blocks to be kept pending, as it may be expected that a microtile will contain shader fragments that would be collected into different shader fragment instance blocks for different FSR values (whilst maintaining the relationship that one shader fragment instance block contains shader fragment task instances relating to one fragment shader). FIG. 13 illustrates this, showing a microtile 1302 containing sampler fragments with an FSR value of 2×4 (shaded with lines sloping down to the right) and also with an FSR value of 1×4 (shaded with vertical lines). The figure shows how the shader fragments obtained from microtile 1302 are equivalent to those obtained from two single-FSR microtiles 1304 and 1306, on which are illustrated how the extents of the obtained shader fragments compare to the extents of the sample fragments. The resulting shader fragments thus relate to different FSR values and will contribute to different shader fragment instance blocks, which will need to created/filled in parallel. In contrast, in the situation that the incoming microtiles of different FSR value are separated into batches (i.e. in a temporal sense) due to the buffer flush being performed in per-FSR passes, it is not necessary to maintain partially filled shader fragment instance blocks for different FSR values. Rather, a change in the FSR value of incoming microtiles would instigate a flush of any partially filed shader fragment instance block(s) for the previous FSR value.

As a result, following step S1204, the shader fragment task instances have been collected into shader fragment instance blocks but, in contrast to the method of FIG. 9, the blocks are not necessarily issued in groups having the same FSR value but are more mixed together. Next, at step S1206, those blocks can be collected such that blocks (and thus shader fragment task instances) requiring a common fragment shader program are combined into a shading task. As previously explained, other criteria (e.g. the sharing of some other state) may additionally be applied to determine which blocks to group into a larger shading task. As also mentioned above, because the method allows for blocks relating to different FSR values (but the same shader) to be combined into a shader task, the most efficient way of providing the relevant information about sample size and sampling pattern is to maintain that information at a per instance block granularity in the created shader task. This allows for the shader task to then be processed, with the individual blocks being handled in much the same way as previously, particularly with respect to the calculation of delta values between task instances, whilst also allowing blocks relating to the different FSR values to be processed in parallel.

Figure 14:
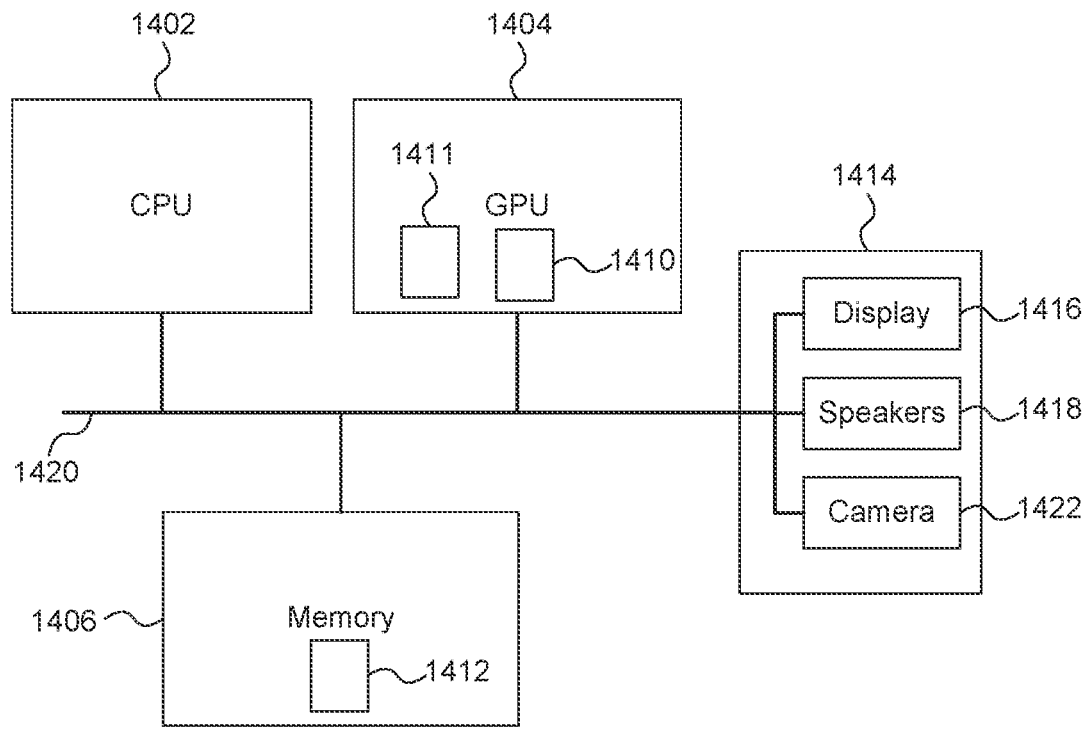
FIG. 14 shows a computer system in which a graphics processing system is implemented.

FIG. 14 shows a computer system in which the graphics processing systems described herein may be implemented. The computer system comprises a CPU 1402, a GPU 1404, a memory 1406 and other devices 1414, such as a display 1416, speakers 1418 and a camera 1422. One or more processing blocks 1410 (e.g. corresponding to processing blocks 104 and 106) can implemented on the GPU 1404, as well as a Neural Network Accelerator (NNA) 1411. In other examples, the processing block(s) 1410 may be implemented on the CPU 1402 or within the NNA 1411. The components of the computer system can communicate with each other via a communications bus 1420. A store 1412 (corresponding to memory 102) is implemented as part of the memory 1406.

While FIG. 14 illustrates one implementation of a graphics processing system, it will be understood that a similar block diagram could be drawn for an artificial intelligence accelerator system—for example, by replacing either the CPU 1402 or the GPU 1404 with a Neural Network Accelerator (NNA) 1411, or by adding the NNA as a separate unit. In such cases, again, the processing block(s) 1410 can be implemented in the NNA.

The graphics processing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof (the term "block" is also used to refer to a group of gathered shader fragment task instances, and the different usages are apparent from the context). In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 15.

Figure 15:
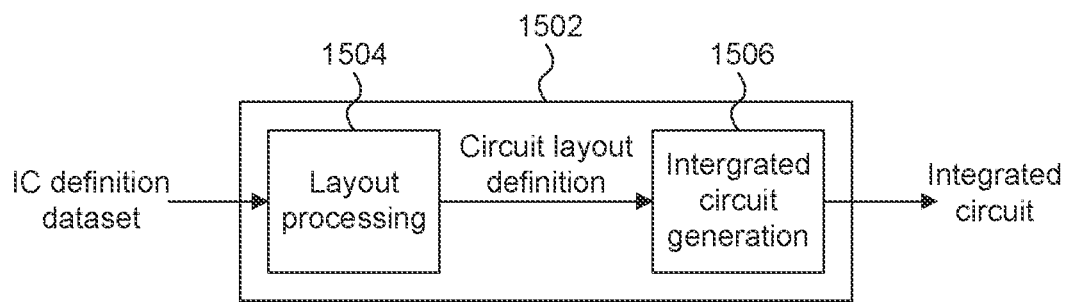
FIG. 15 shows an integrated circuit manufacturing system for generating an integrated circuit embodying a graphics processing system.

FIG. 15 shows an example of an integrated circuit (IC) manufacturing system 1502 which is configured to manufacture a graphics processing system as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1502 to manufacture an integrated circuit embodying a graphics processing system as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering, in a rendering space, a scene formed by primitives in a graphics processing system, the method comprising:
a rendering phase comprising the steps of:
receiving data describing one or more primitives and one or more associated fragment shading rates to be used during rendering,
storing in a buffer sampler fragments for the one or more primitives corresponding to sample positions of the one or more primitives within a region of the rendering space,
parsing the buffer to produce microtiles, each microtile corresponding to an array of sample positions within the region and containing sampler fragments from the one or more primitives,
analysing the microtiles to identify shader fragment task instances to be shaded, and
arranging the shader fragment task instances into blocks, wherein at least one block of shader fragment task instances comprises shader fragment task instances from more than one microtile; and
shading the blocks of shader fragment task instances.

2. The method of claim 1, wherein the at least one block of shader fragment task instances comprises shader fragment task instances having the same fragment shading rate.

3. The method of claim 1, wherein the shader fragment task instances arranged into a given block relate to neighbouring shader fragments in the rendering space.

4. The method of claim 1, wherein shading comprises, for a shader fragment task instance of the at least one block, calculating a delta value for a parameter using information about another one of the shader fragments that corresponds to a shader fragment task instance within the same block.

5. The method of claim 1, wherein analysing the microtiles comprises identifying shader fragment task instances within a microtile.

6. The method of claim 1, wherein parsing the buffer to produce microtiles comprises, for each one of a plurality of fragment shading rates in turn, searching the buffer for samples associated with the one of the plurality of fragment shading rates and outputting the associated microtiles.

7. The method of claim 1, wherein storing in a buffer comprises performing hidden surface removal to identify and not store one or more sampler fragments within the rendering space that do not contribute to the scene to be rendered.

8. The method of claim 1, wherein storing in the buffer comprises storing sampler fragments for a plurality of primitives corresponding to the sample positions within the region of the rendering space.

9. The method of claim 1, wherein the method further comprises a geometry processing phase before the rendering phase.

10. The method of claim 1, wherein the geometry processing phase comprises transforming the primitives into the rendering space, and storing data relating to the transformed primitives, and/or determining and storing control stream data indicating which primitives are relevant for rendering different regions of the rendering space.

11. A graphics processing system configured to render a scene formed by primitives, wherein the graphics processing system comprises rendering logic configured to:
receive data describing one or more primitives and one or more associated fragment shading rates to be used during rendering;
store, in a buffer, sampler fragments for the one or more primitives corresponding to sample positions of the one or more primitives within a region of the rendering space;
parse the buffer to produce microtiles, each microtile corresponding to an array of sample positions within the region and containing sampler fragments from the one or more primitives;
analyse the microtiles to identify shader fragment task instances to be shaded;
arrange the shader fragment task instances into blocks, wherein at least one block of shader fragment task instances comprises shader fragment task instances from more than one microtile; and
shade the blocks of shader fragment task instances.

12. The graphics processing system of claim 11, wherein the at least one block of fragment task instances comprises fragment task instances having the same fragment shading rate.

13. The graphics processing system of claim 11, wherein the fragment task instances arranged into a given block relate to neighbouring fragments in the rendering space.

14. The graphics processing system of claim 11, wherein the rendering logic configured to store sampler fragments in a buffer is further configured to perform hidden surface removal to identify and not store one or more sampler fragments within the rendering space that do not contribute to the scene to be rendered.

15. The graphics processing system of claim 11, further comprising geometry processing logic configured to transform the primitives into the rendering space, and store data relating to the transformed primitives in a memory, and/or to determine and store in a memory control stream data indicating which primitives are relevant for rendering different regions of the rendering space.

16. The graphics processing system of claim 11, wherein the graphics processing system is embodied in hardware on an integrated circuit.

17. A method of manufacturing, using an integrated circuit manufacturing system, a graphics processing system as set forth in claim 11, the method comprising:
processing, using a layout processing system, a computer readable dataset description of the graphics processing system so as to generate a circuit layout description of an integrated circuit embodying the graphics processing system; and
manufacturing, using an integrated circuit generation system, the graphics processing system according to the circuit layout description.

18. A non-transitory computer readable storage medium having stored thereon computer readable code configured to cause the method as set forth in claim 1 to be performed when the code is run.

19. A non-transitory computer readable storage medium having stored thereon an integrated circuit definition dataset that, when processed in an integrated circuit manufacturing system, configures the integrated circuit manufacturing system to manufacture a graphics processing system as set forth in claim 11.

20. An integrated circuit manufacturing system configured to manufacture a graphics processing system as set forth in claim 11.

* * * * *